United States Patent
Choi et al.

(10) Patent No.: US 10,389,494 B2
(45) Date of Patent: Aug. 20, 2019

(54) UPLINK SCHEDULING FOR LICENSE ASSISTED ACCESS

(71) Applicant: Intel IP Corporation, Santa Clara, CA (US)

(72) Inventors: Gi Wan Choi, San Jose, CA (US); Hwan-Joon Kwon, Santa Clara, CA (US); Abhijeet Bhorkar, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/537,024

(22) PCT Filed: Dec. 10, 2015

(86) PCT No.: PCT/US2015/064925
§ 371 (c)(1),
(2) Date: Jun. 16, 2017

(87) PCT Pub. No.: WO2016/122784
PCT Pub. Date: Aug. 4, 2016

(65) Prior Publication Data
US 2017/0366308 A1    Dec. 21, 2017

Related U.S. Application Data

(60) Provisional application No. 62/110,185, filed on Jan. 30, 2015.

(51) Int. Cl.
*H04W 74/08* (2009.01)
*H04L 1/18* (2006.01)
(Continued)

(52) U.S. Cl.
CPC ........... *H04L 1/1887* (2013.01); *H04L 5/008* (2013.01); *H04L 5/0055* (2013.01);
(Continued)

(58) Field of Classification Search
CPC . H04W 72/14; H04W 74/0816; H04W 72/04; H04W 72/082; H04W 72/1215; H04W 76/02; H04W 76/025; H04J 11/00
See application file for complete search history.

(56) References Cited

U.S. PATENT DOCUMENTS

2009/0323597 A1* 12/2009 Harada ................ H04B 7/2653
370/329
2014/0079015 A1   3/2014 Kim et al.
(Continued)

FOREIGN PATENT DOCUMENTS

CN          107211441        9/2017

OTHER PUBLICATIONS

"3GPP; TSG RAN; Study on Licensed-Assisted Access to Unlicensed Spectrum; (Release 13)", 3GPP TR 36.889 V0.1.1, (Dec. 1, 2014), 28-31.
(Continued)

*Primary Examiner* — Mohamed A Kamara
(74) *Attorney, Agent, or Firm* — Schwegman Lundberg & Woessner, P.A.

(57) ABSTRACT

Systems, apparatus, user equipment (UE), evolved node B (eNB), computer readable media, and methods are described for uplink grants and hybrid automatic repeat requests (HARQ) in communications systems. Some embodiments operate to determine that an unlicensed first channel is idle based on a sensing of the first channel for a first period of time. Such an embodiment may then generate a reservation signal on the first channel and an uplink grant for a first user equipment (UE). After the uplink grant is communicated, the embodiment senses the first channel to detect a physical uplink shared channel (PUSCH) transmission associated
(Continued)

with the uplink grant. A HARQ acknowledgment or negative acknowledgement may be sent in various embodiments following the sensing.

24 Claims, 14 Drawing Sheets

(51) Int. Cl.
    *H04W 72/14*           (2009.01)
    *H04L 5/00*            (2006.01)
    *H04J 11/00*           (2006.01)

(52) U.S. Cl.
    CPC ............ *H04L 5/0094* (2013.01); *H04W 72/14* (2013.01); *H04W 74/0816* (2013.01); *H04J 11/00* (2013.01); *H04L 5/0007* (2013.01)

(56) References Cited

U.S. PATENT DOCUMENTS

| | | | | |
|---|---|---|---|---|
| 2014/0269605 A1* | 9/2014 | Pecen | ................... | H04W 56/00 370/330 |
| 2014/0341018 A1 | 11/2014 | Bhushan et al. | | |
| 2016/0050667 A1* | 2/2016 | Papasakellariou | ........................... | H04W 74/0808 370/329 |
| 2016/0095110 A1* | 3/2016 | Li | ..................... | H04W 72/1215 370/329 |

OTHER PUBLICATIONS

"Analysis of LAA UL enhancement", R1-144830, 3GPP TSG RAN WG1 Meeting #79, (Nov. 8, 2014), 1-4.
"Candidate solutions for LAA operation", R1-144042, 3GPP TSG RAN WG1 Meeting #78bis, (Sep. 27, 2014), 1,2 pgs.
"Data scheduling and control signaling in LAA", R1-144904, 3GPP TSG RAN WG1 Meeting #79, (Nov. 8, 2014), 4 pgs.
"International Application Serial No. PCT/US2015/064925, International Search Report dated Mar. 28, 2016", 4 pgs.
"International Application Serial No. PCT/US2015/064925, Written Opinion dated Mar. 28, 2016", 8 pgs.
"Views on issues related to LAA UL", R1-144970, 3GPP TSG RAN WG1 Meeting #79, (Nov. 8, 2014), 1-3.
"International Application Serial No. PCT US2015 064925, International Preliminary Report on Patentability dated Aug. 10, 2017", 11 pgs.
"European Application Serial No. 15880643.0, Extended European Search Report dated Aug. 9, 2018", 13 pgs.

* cited by examiner

UPLINK SCHEDULING FOR LICENSE ASSISTED ACCESS

PRIORITY CLAIM

This application is a U.S. National Stage Filing under 35 U.S.C. 371 from International Application No. PCT/US2015/064925 filed Dec. 10, 2015 and published in English as WO 2016/122784 on Aug. 4, 2016, which claims the benefit of priority to U.S. Provisional Patent Application Ser. No. 62/110,185, filed on Jan. 30, 2015, and entitled "UPLINK SCHEDULING AND HARQ FOR, LICENSED-ASSISTED ACCESS USING LTE", each of which is incorporated herein by reference in its entirety.

TECHNICAL FIELD

Embodiments pertain to systems, methods, and component devices for wireless communications, and particularly to the integration of license assisted access to unlicensed frequencies for long term evolution (LTE), LTE-advanced, and other similar wireless communication systems.

BACKGROUND

LTE and LTE-advanced are standards for wireless communication of high-speed data for user equipment (UE) such as mobile telephones. In LTE-advanced and various wireless systems, carrier aggregation is a technology used by LTE-advanced where multiple carrier signals operating on different frequencies may be used to carry communications for a single UE, thus increasing the bandwidth available to a single device. In some embodiments, carrier aggregation may be used where one or more component carriers operate on unlicensed frequencies.

DETAILED DESCRIPTION

Embodiments relate to systems, devices, apparatus, assemblies, methods, and computer readable media to enhance wireless communications, and particularly to communication systems that operate carrier aggregation and license assisted access. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments, and are intended to cover all available equivalents of the elements described.

Figure 1:
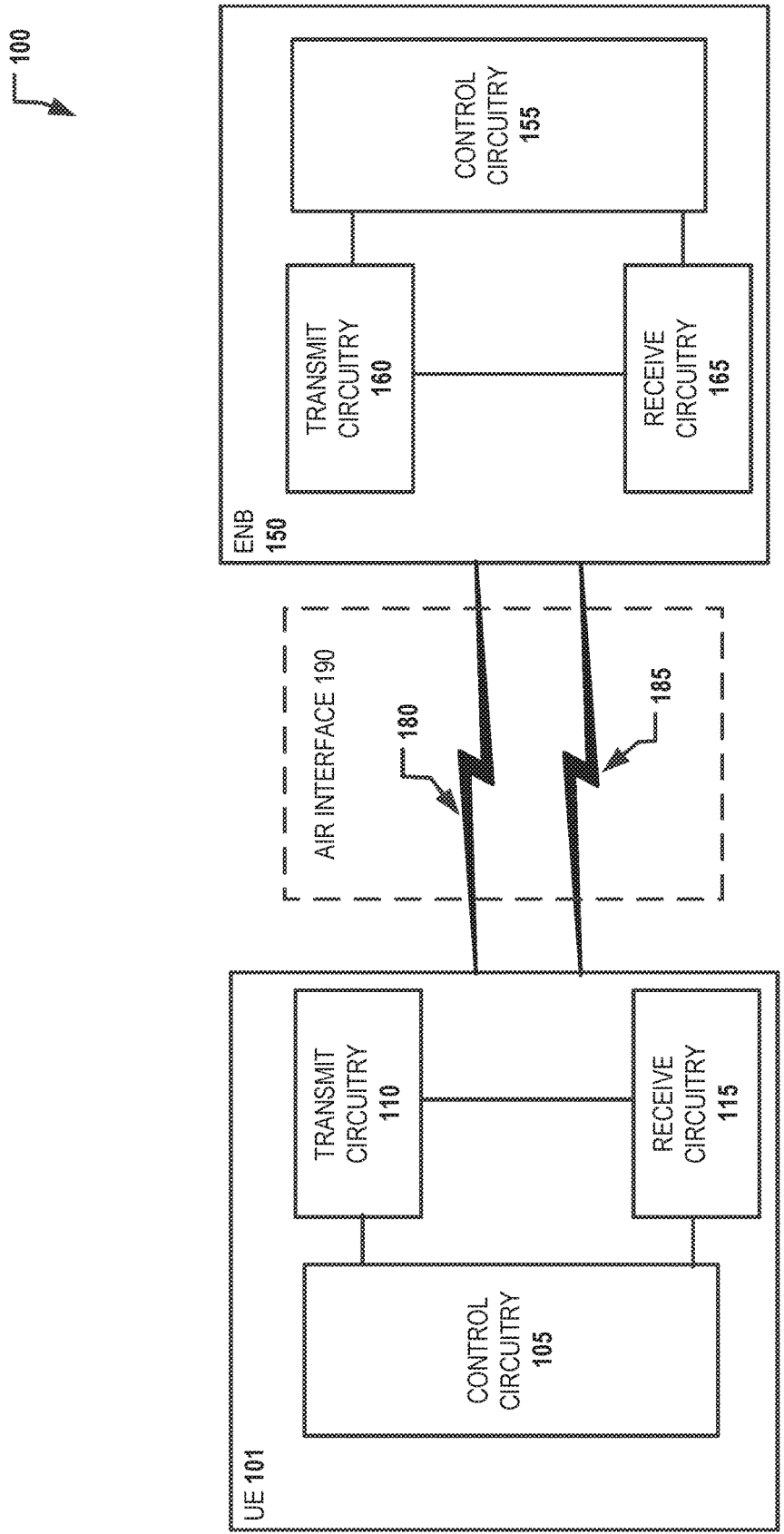
FIG. 1 is a block diagram of a system including an evolved node B (eNB) and user equipment (UE) that may operate according to some embodiments described herein.

FIG. 1 illustrates a wireless network 100, in accordance with some embodiments. The wireless network 100 includes a UE 101 and an eNB 150 connected via an air interface 190. UE 101 and eNB 150 communicate using a system that supports carrier aggregation, such that air interface 190 supports multiple frequency carriers, shown as component carrier 180 and component carrier 185. Although two component carriers are illustrated, various embodiments may include any number of two or more component carriers.

Additionally, in various embodiments described herein, at least one of the carriers of air interface 190 comprises a carrier operating in an unlicensed frequency, referred to herein as an unlicensed carrier. An unlicensed carrier or unlicensed frequency refers to system operation in a range of radio frequencies that are not exclusively set aside for the use of the system. Some frequency ranges, for example, may be used by communication systems operating under different communication standards, such as a frequency band that is used by both Institute of Electronic and Electrical Engineers (IEEE) 802.11 standards (e.g. "WiFi") and third generation partnership (3GPP) standards. By contrast, a licensed channel or licensed spectrum operates under a particular system, with limited concern that other unexpected signals operating on different standard configurations will be present.

As discussed below, when a system operates in an unlicensed spectrum, rules and operations for verifying that the unlicensed channels are available provide additional overhead and system operational elements that are not present in licensed channels. The sharing of a channel may be referred to as fair coexistence, where different systems operate to use an unlicensed or shared channel while limiting both interference and direct integration with the other systems operating on different standards.

Long term evolution (LTE) cellular communications, for example, historically operate with a centrally managed system designed to operate in a licensed spectrum for efficient resource usage. Operating with such centrally managed use within unlicensed channels where systems not centrally controlled that use different channel access mechanisms than legacy LTE may be present carries significant risk of direct interference. Coexistence mechanisms described herein enable LTE, LTE-advanced, and communications systems building on or similar to LTE systems to coexist with other technologies such as WiFi in shared unlicensed frequency bands (e.g. unlicensed channels.)

Embodiments described herein for coexistence may operate within the wireless network 100. In wireless network 100, the UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The eNB 150 provides the UE 101 network connectivity to a broader network (not shown). This UE 101 connectivity is provided via the air interface 190 in an eNB service area provided by the eNB 150. In some embodiments, such a broader network may be a wide area network operated by a cellular network provider, or may be the Internet. Each eNB service area associated with the eNB 150 is supported by antennas integrated with the eNB 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the eNB 150, for example, includes three sectors each covering a 120 degree area with an array of antennas directed to each sector to provide 360 degree coverage around the eNB 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with wireless communications using carrier aggregation. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to FDM. The transmit circuitry 110 and the receive circuitry 115 may transmit and receive both control data and content data (e.g. messages, images, video, et cetera) structured within data blocks that are carried by the physical channels.

FIG. 1 also illustrates the eNB 150, in accordance with various embodiments. The eNB 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations for managing channels and component carriers used with various UEs. The transmit circuitry 160 and receive circuitry 165 may be adapted to transmit and receive data, respectively, to any UE connected to eNB 150. The transmit circuitry 160 may transmit downlink physical channels comprised of a plurality of downlink subframes. The receive circuitry 165 may receive a plurality of uplink physical channels from various UEs including UE 101. The plurality of uplink physical channels may be multiplexed according to FDM in addition to the use of carrier aggregation.

As mentioned above, the communications across air interface 190 may use carrier aggregation, where multiple different component carriers 180, 185 can be aggregated to carry information between UE 101 and eNB 150. Such component carriers 180, 185 may have different bandwidths, and may be used for uplink communications from UE 101 to eNB 150, downlink communications from eNB 150 to UE 101, or both. Such component carriers 180, 185 may cover similar areas, or may cover different but overlapping sectors. The radio resource control (RRC) connection is handled by only one of the component carrier cells, which may be referred to as the primary component carrier, with the other component carriers referred to as secondary component carriers. In some embodiments, the primary component carrier may be operating in a licensed band to provide efficient and conflict-free communications. This primary channel may be used for scheduling other channels including unlicensed channels as described below.

Figure 2:
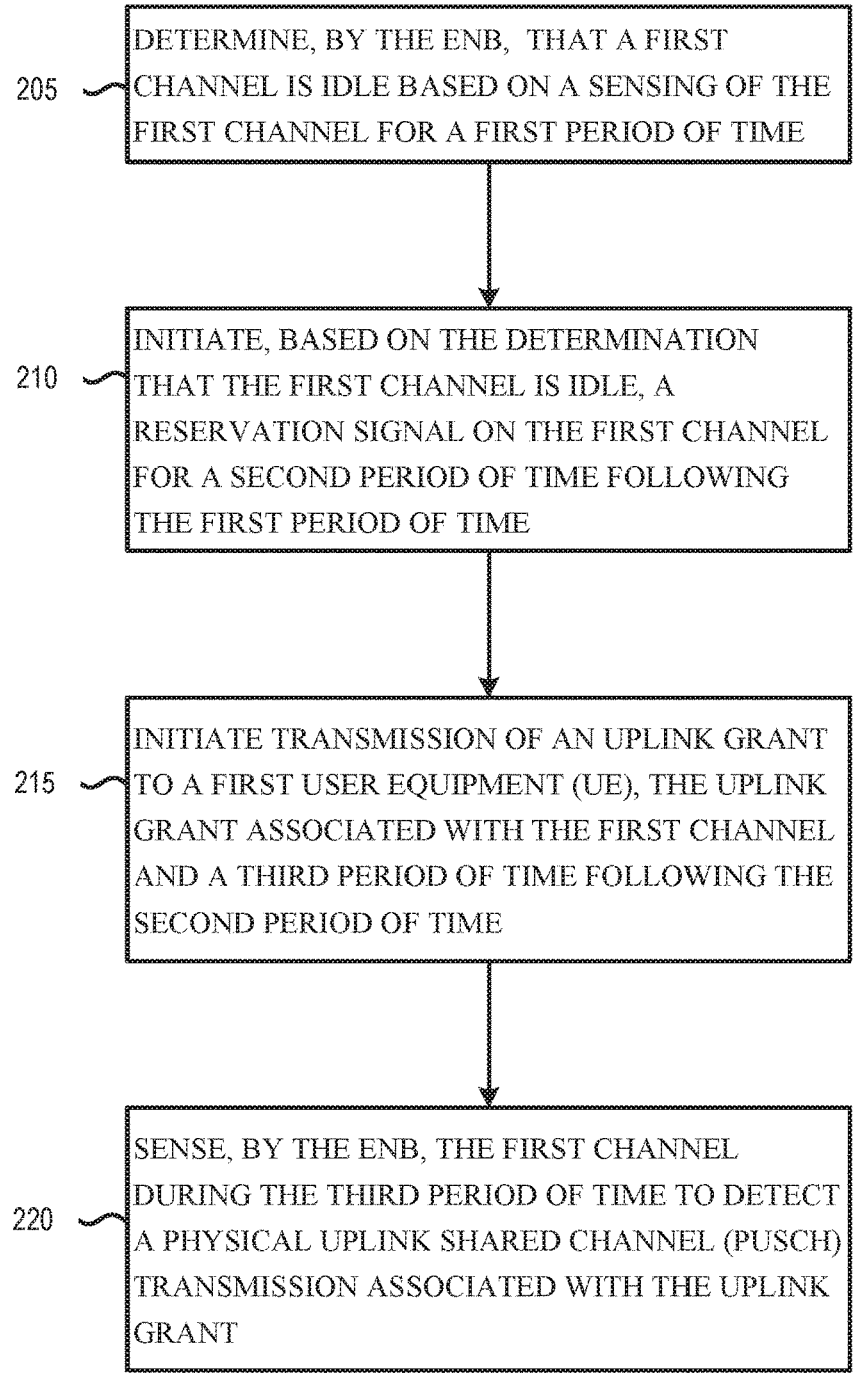
FIG. 2 describes a method for uplink scheduling with license assisted access according to some embodiments.
Figure 3:
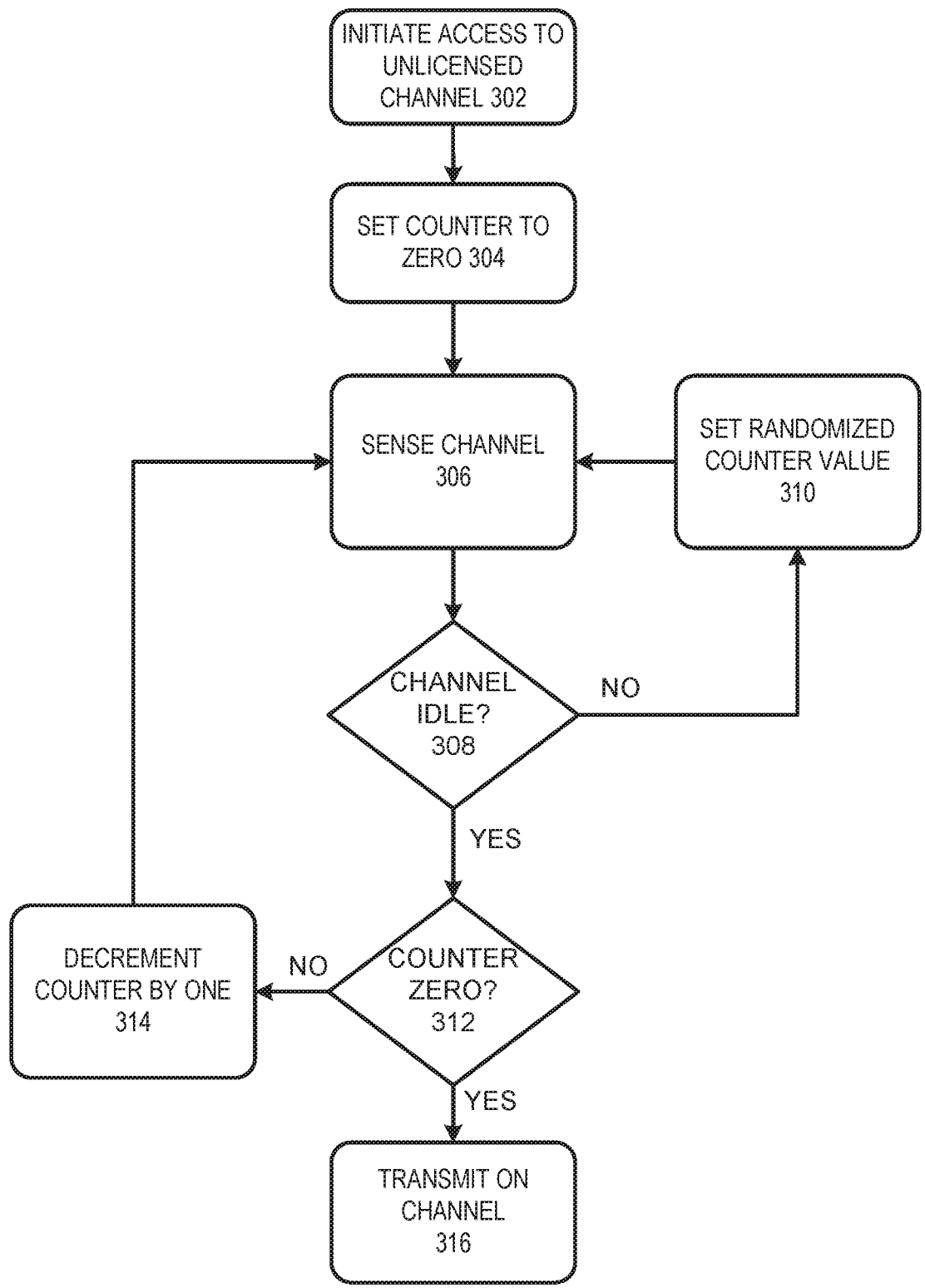
FIG. 3 describes a method that may be used as part of accessing an unlicensed channel according to some embodiments described herein.

FIG. 2 then describes one potential method for an eNB managing a UE to utilize an unlicensed channel for communication of uplink data on the unlicensed channel. Additional details, examples, and alternatives then follow. For simplicity and convenience, method 200 is described with respect to wireless network 100 of FIG. 1. In various embodiments, different networks with different structures or additional devices may be used. In method 200, operation 205 includes eNB 150 which uses component carrier 180 which is used for a first unlicensed channel. As part of operation 205, eNB 150 determines that the first channel (e.g. component carrier 180) is idle based on a sensing of the first channel for a first period of time. While air interface 190 is shown as including two component carriers 180 and 185, in other embodiments, any number of component carriers possible within the constraints of the available bandwidth are possible. Thus, in some embodiments multiple licensed channels and multiple unlicensed channels may be present at the same time, and operations for an eNB to schedule uplink communications on different unlicensed channels may occur simultaneously. FIG. 3 detailed below includes an example of a sensing process that may be used in operation 205. In other embodiments, other sensing operations may be used.

In operation 210, control circuitry 155 of eNB 150 initiates transmission of a reservation signal by transmit circuitry 160 based on the determination that the first channel is idle from operation 205. Transmission of the reservation signal on the first channel occurs during a second time period following the first time period. In other words, an initial sensing of the unlicensed channel occurs in operation 205 with no transmissions by eNB 150 made on the unlicensed channel. After sufficient time has passed to allow a determination that the unlicensed channel is idle, eNB 150 begins using the channel with the transmission of the reservation signal. In various embodiments, the reservation signal can be a noise signal, can include control or identification information, can be a data signal, or can be any other such signal that is detectable by other devices that sense the unlicensed channel to determine if it is in use. In some embodiments, a reservation signal is a short transmission or series of short transmissions sent with sufficient frequency during a reservation time period to provide notification to other devices that the unlicensed channel is in use.

In operation 215, the control circuitry 155 of eNB 150 initiates transmission by transmit circuitry 160 of an uplink grant to UE 101. The uplink grant may be communicated on the unlicensed channel, on a licensed master channel, or on any other such channel. In some embodiments, the uplink grant may be structured as part of a physical downlink control channel (PDCCH). In some embodiments, the uplink grant may be part of the reservation signal. The uplink grant is associated with a third time period when the UE 101 has the opportunity to upload data to the eNB 150 on the unlicensed channel. In embodiments using standard LTE synchronous timing, the uplink transmission (PUSCH) is scheduled for a time that is a fixed number of subframes after transmission of the uplink grant. In embodiments that operate with asynchronous timing, the uplink grant may simply include details associated with the time period for the uplink grant in the uplink grant communication.

After the eNB 150 transmits the uplink grant, the UE 101 receives and processes the grant, and attempts to transmit uplink communications during the uplink grant time. In some operations, the UE 101 may successfully transmit information on the unlicensed channel. In other embodiments, the UE 101 uplink communication may not be transmitted due to interference on the unlicensed channel. In still further embodiments, the UE 101 may transmit the uplink signal associated with the uplink grant, but the transmitted signal may not be received at the eNB 150 due to errors or interference. In accordance with LTE and LTE-advanced structures, the uplink transmission that the UE 101 generates and attempts to send is structured for communication as part of a physical uplink shared channel (PUSCH).

In operation 220, the eNB 150 senses, using receive circuitry 165, the first channel during the third period of time associated with the uplink grant. As mentioned above, the eNB 150 may or may not successfully receive the PUSCH signal from UE 101.

FIG. 3 describes a method that may be used as part of accessing an unlicensed channel according to some embodiments described herein. In some embodiments, FIG. 3 is considered an example of "listen before talk" operation that is used to determine whether a device is allowed to transmit on a shared channel. The method of FIG. 3 may be part of operation 205 described above. In operation 302, an eNB such as eNB 150 initiates access to an unlicensed channel. This may be part of structured system operation, load-based use of additional channel resources, time-based use of additional channel resources, or any other such trigger to use unlicensed channels. In some embodiments, for example, an eNB may detect that a particular UE is in a position and/or is expected to upload data in such a way that the UE will be able to efficiently use unlicensed channels for uplink communications.

Once the eNB initiates the process for using an unlicensed channel, a counter associated with the channel is set to zero in operation 304, and in operation 306 the eNB begins sensing for transmissions on the channel in operation 306. In operation 308, control circuitry of the eNB processes information from receive circuitry gathered while sensing the channel to determine if the channel is idle. This determination may be made based on energy levels, energy patterns, or both detected while receive circuitry senses the channel. For example, in some embodiments, if the energy detected while sensing the channel is above a threshold level, the control circuitry determines that the channel is not idle. If the control circuitry of the eNB determines that the channel is not idle, a value for the counter that was set to zero in operation 304 is set to a randomized value in operation 310. This essentially sets a random back-off value that is used to count-down once the channel is identified as idle. While the channel is not idle, a loop occurs where the receive circuitry senses the channel, the control circuitry determines that the channel is in use, and a new counter value is selected. In some embodiments, a counter value may only be selected once prior to the control circuitry determining that the channel is idle.

Once a decision is made in an iteration of operation 308 that the channel is idle, the control circuitry checks to see if the counter is zero in operation 312. If the counter is not zero, the control circuitry decrements the counter by one in operation 314, and continues sensing the channel in operation 306. A new loop is thus created that counts down while the channel is idle. If the countdown is interrupted by a determination that the channel is no longer idle in an iteration of operation 308, then a new randomized counter value is set in operation 310. If the countdown is not interrupted, then, when the control circuitry determines that the counter is zero in an iteration of operation 312, the eNB transmits on the channel in operation 316. This process may be performed by any eNB or UE which is sensing an unlicensed channel to determine if the unlicensed channel is available for use.

In various embodiments, the randomized counter value of operation 310 may be selected in different ways. For example, the counter may be selected as the next value in a pseudo-random list of numbers, or may be determined by random number circuitry or an apparatus of a device. In some embodiments, the randomized counter value has both minimum and maximum values. The values may be associated with the time to perform a processing loop, or may be associated with a set number of system subframes. For example, in one embodiment, the randomized counter value may be between 1 and 10, with a delay between each sensing operation 306 and either the associated decrement operation 314 or the associated selection of a new value being 1 millisecond. In other embodiments, the randomized counter may be selected as a value between 4 and 50, with the delay being 500 microseconds. In other embodiments, other such values may be used. Similarly, in other embodiments, rather than using simple counter values, clock or timing values, or any other such randomized delay operation coupled with idle logic may be used. In some embodiments where both an eNB and a UE communicating with each other use a listen before talk operation, the eNB and UE may both use the same method, such as the method of FIG. 3 discussed above, or the devices may use different methods. In an embodiment with multiple UEs attempting to use the unlicensed channel, all the UEs may be set with the same listen before talk operation to reduce the likelihood of interference between UEs.

Figure 4:
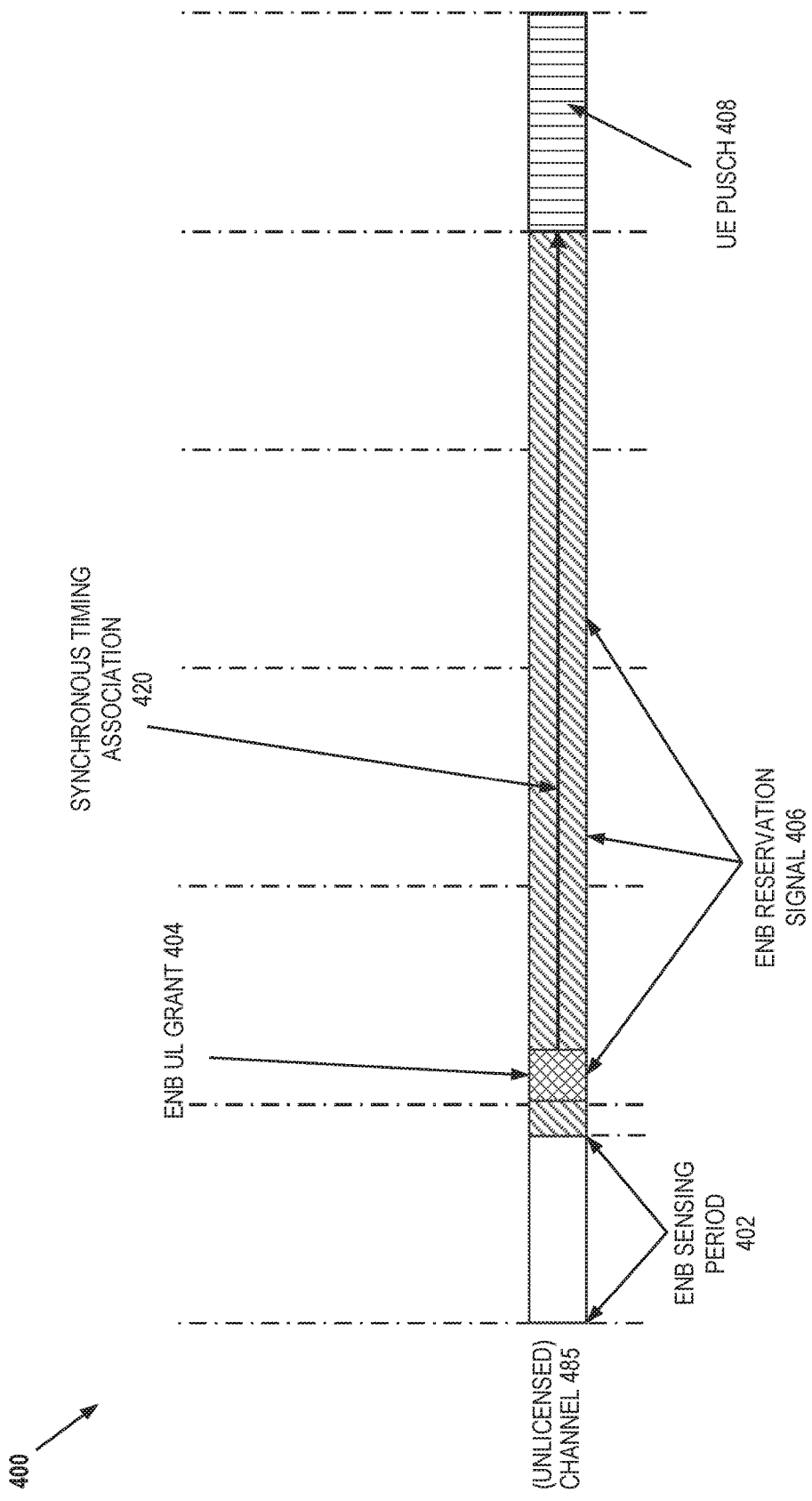
FIG. 4 illustrates aspects of uplink scheduling with license assisted access according to certain embodiments.

FIG. 4 then illustrates aspects of uplink scheduling with license assisted access according to certain embodiments. FIG. 4 includes a diagram of channel usage 400 for an unlicensed channel 485 during one period from an eNB initiating use of the channel to the end of the UE transmitting data on the channel in response to a grant from the eNB.

As mentioned above, an unlicensed channel as described herein refers to a channel that is not exclusively reserved for the centrally controlled system that the eNB is a part of. This may mean that the channel is reserved for multiple systems using different communications standards, or that the channel is open for any communication use. Channel use 400 begins with an eNB sensing period 402 described above with respect to FIG. 3. While such sensing period 402 may include periods where the channel 485 is not idle, as described in FIG. 3, no use of channel 485 occurs during the sensing period 402, and following the sensing period 402, the eNB transmits eNB reservation signal 406. This signal may comprise random transmissions, data identifying the system reserving the channel, downlink data for one or more UEs, or any other such data. As illustrated, eNB reservation signal 406 includes eNB uplink grant 404 which communicates grant information to a UE. In other embodiments, the uplink grant from the eNB to a UE may be sent on a different channel. In the embodiment of FIG. 4, the eNB uplink grant 404 is associated with an uplink time period by a fixed number of transmission periods, such that the UE is set to attempt to use the channel 485 at a fixed time period following receipt of the eNB uplink grant 404 as part of a synchronous timing association 420. Thus, eNB uplink grant 404 may simply indicate that the UE is given a grant without providing data specifically indicating the time period for the UE PUSCH 408 transmission, since the UE can assume the time period under synchronous operation.

Further, in the embodiment of FIG. 4, the eNB reservation signal 406 extends through the time period between eNB uplink grant 404 and the beginning of the UE transmitting UE PUSCH 408, with no idle period provided for the UE to perform a listen before talk operation. In such an embodiment, the eNB may either communicate to the UE that the eNB has reserved channel 485 for the UE, or the system may operate with an implicit assumption that the centralized eNB operation is performing channel conflict operations (e.g., listen before talk) on behalf of the UE.

Figure 5:
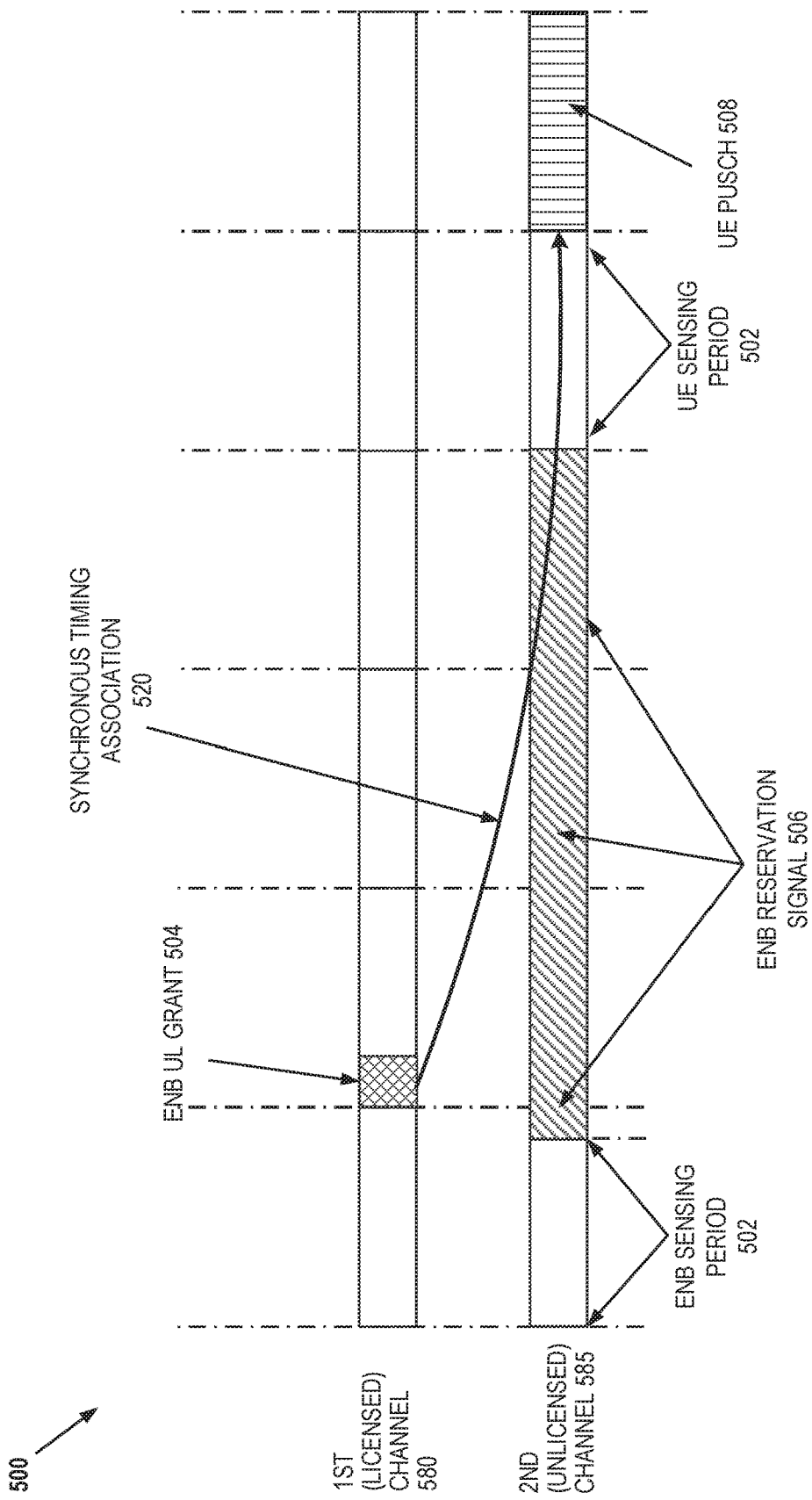
FIG. 5 illustrates aspects of uplink scheduling with license assisted access according to certain embodiments.

FIG. 5 then illustrates aspects of uplink scheduling with license assisted access according to certain embodiments. Whereas channel usage 400 of FIG. 4 included the eNB uplink grant 404 within the eNB reservation signal 406, in channel usage 500 of FIG. 5, the eNB uplink grant 504 is sent on a different licensed channel 580. Additionally, eNB reservation signal 506 ends with sufficient time for the UE to perform a listen before talk operation during UE sensing period 502.

In the embodiment associated with FIG. 5, then, the eNB follows a determination to use unlicensed channel 585 with a sensing operation similar to the operation described in FIG. 3 during eNB sensing period 502. Once the usage conflict operation is complete, the eNB sends eNB reservations signal 506 on the second unlicensed channel 585, and sends an eNB uplink grant to a UE on a first licensed channel 580. The eNB uplink grant 504 may be sent at any time. In some embodiments, the eNB uplink grant is not generated until after the eNB has taken control of unlicensed channel 585, and so will be transmitted following an initial transmission associated with eNB reservation signal 506. Just as with FIG. 4, the channel usage 500 of FIG. 5 includes a synchronous timing association 520 between eNB uplink grant 504 and the UE uplink transmission of UE PUSCH 508. Some systems may not authorize a UE to use the channel reservation operations performed by an eNB, for example, to prevent a centrally managed eNB from reserving the channel at all times without devices on other systems having any chance to use the system. UE sensing period 502 allows the UE to perform a channel usage conflict operation similar to the operations described in FIG. 3, while also providing other devices a chance to use the unlicensed channel 585. If another device begins using channel 585 during UE sensing period 502, then the transmission of UE PUSCH 508 will simply not occur, and the eNB will not receive any data from the UE when the eNB is sensing on the channel 585 during the time period associated with eNB uplink grant 504 based on synchronous timing association 520. If no other device takes control of channel 585 during UE sensing period, then in the following time period set by synchronous timing association 520, the UE transmits uplink data as part of UE PUSCH 508.

Figure 6:
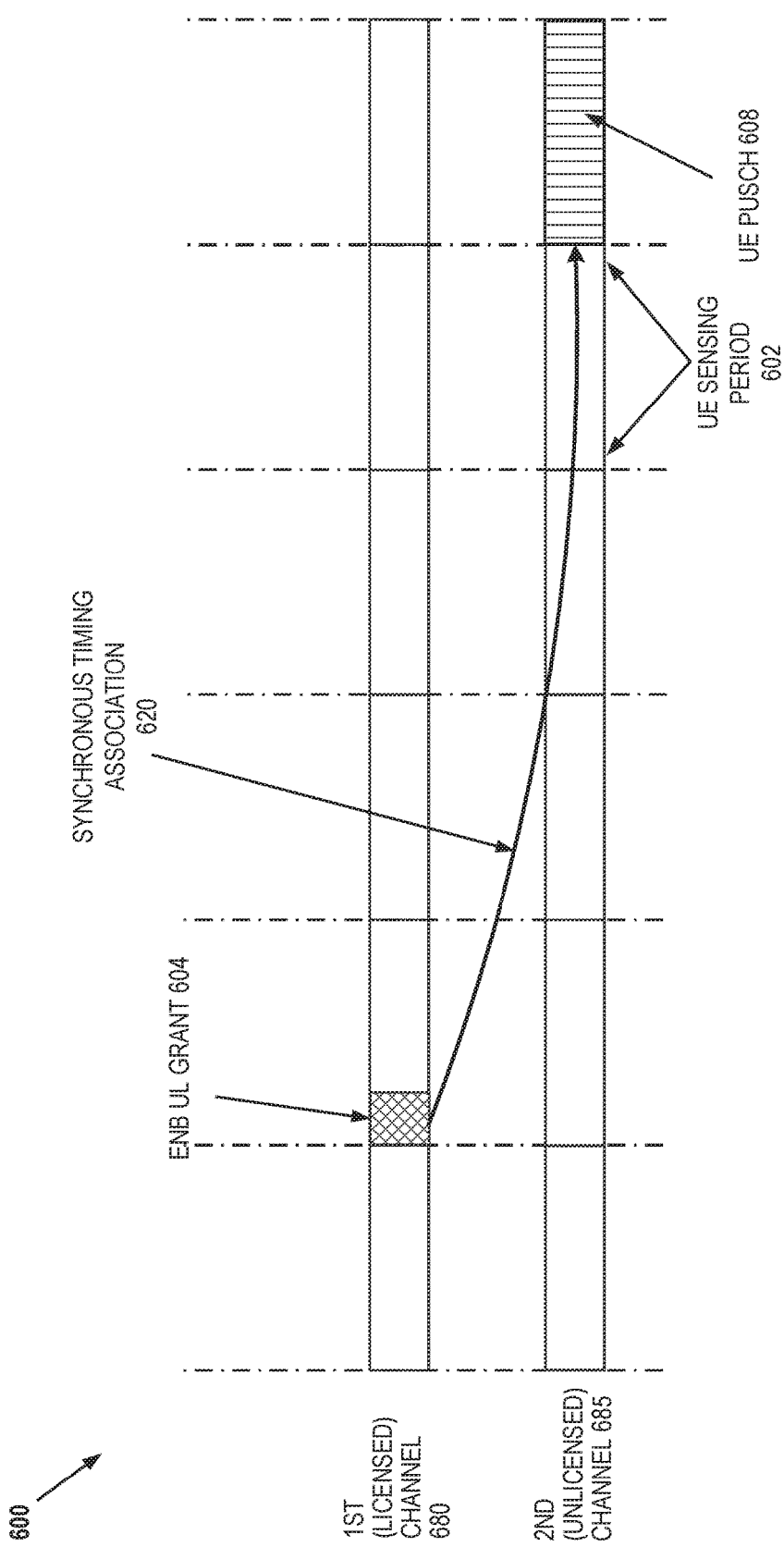
FIG. 6 illustrates aspects of uplink scheduling with license assisted access according to certain embodiments.

FIG. 6 illustrates aspects of still another embodiment including uplink scheduling with license assisted access according to certain embodiments. In the embodiment of FIG. 6, the eNB essentially provides a blind uplink grant, without any knowledge of whether the unlicensed channel 685 is in use. The eNB does not sense the unlicensed channel 685 and does not transmit at all on the unlicensed channel 685. Instead, the eNB simply provides an uplink grant using eNB uplink grant 604 on a first licensed channel 680, and senses at the time period set by synchronous timing association 620 to determine if the UE is able to successfully use channel 685. The UE then performs a listen before talk operation during UE sensing period 602, and if the second unlicensed channel 685 is available, the UE transmits uplink data as UE PUSCH 608 during the available time period.

While the channel usage 600 described in FIG. 6 includes a higher chance that the UE will not be able to use the channel at the time period set by synchronous turning associated 620, this channel operation leaves channel 685 available for use by other devices and provides a more efficient use of the resource. In further operations, UE sensing period 602 may occur earlier at any time following receipt of the eNB uplink grant 604 at the UE. The UE may then transmit a reservation signal from the end of UE sensing period 602 until the beginning of the uplink grant time when the UE transmits data using UE PUSCH 608.

Figure 7:
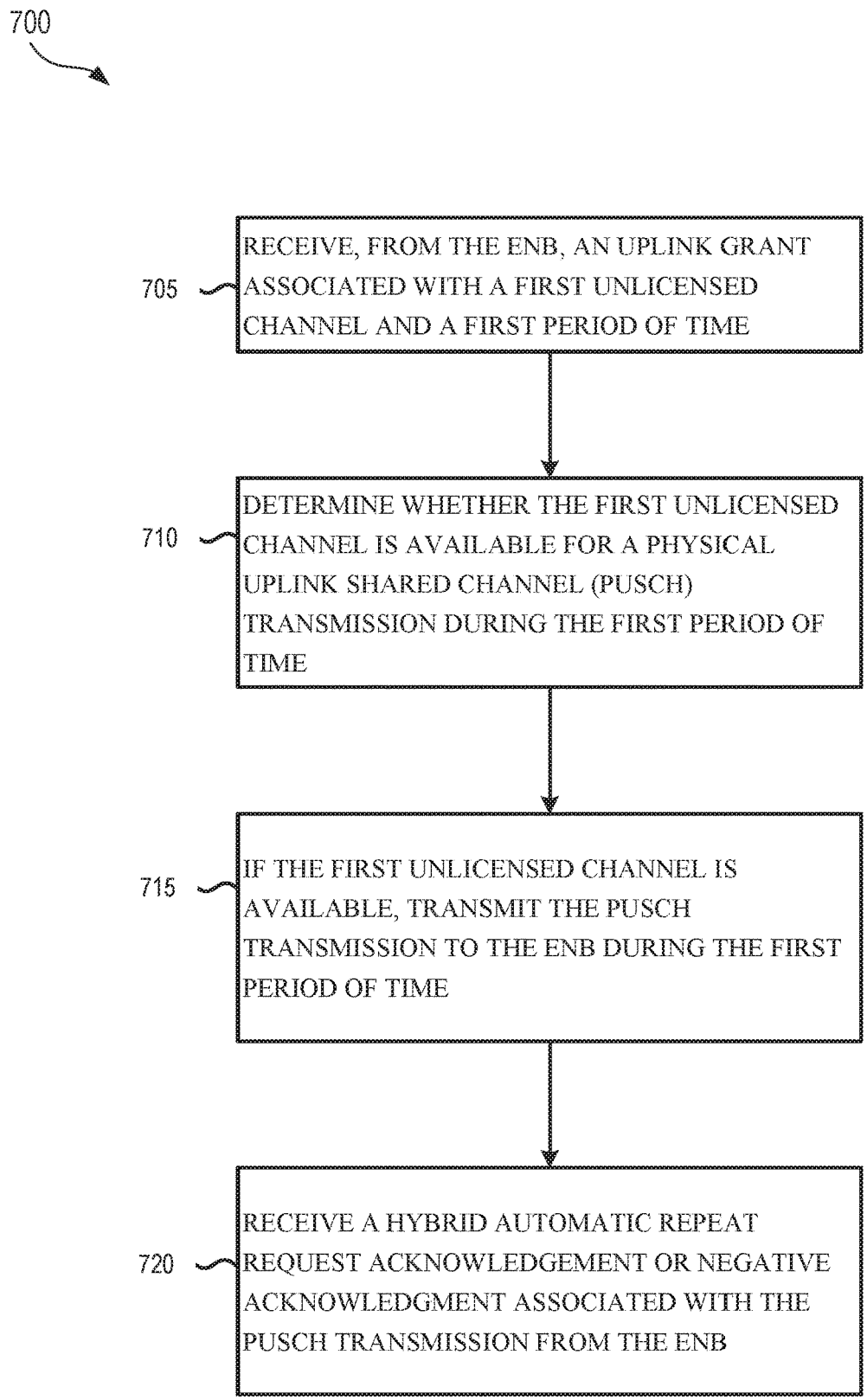
FIG. 7 describes a method for uplink scheduling with license assisted access according to some embodiments.

FIG. 7 describes a method 700 for uplink scheduling with license assisted access according to some embodiments. Method 700 is an operation performed by a UE in communication with an eNB, such as UE 101 in communication with eNB 150. For the purposes of illustration, method 700 is described within the context of channel use 600 of FIG. 6. In various embodiments, other systems and combinations of channels may be used with method 700. Method 700 as illustrated begins with operation 705 where the UE receives, from an eNB, an uplink grant 604 associated with a first unlicensed channel 685 and a first period of time (e.g., the period of time covered by UE PUSCH 608.) In response to receipt of the uplink grant 604, the UE determines whether the first unlicensed channel 685 is available for a UE PUSCH 608 transmission during the first period of time as part of operation 710. In operation 715, if the first unlicensed channel 685 is available for UE PUSCH 608 transmissions, then the UE transmits the UE PUSCH transmission 608 to the eNB during the scheduled period of time. Then, in operation 720, the UE receives a hybrid automatic repeat request (HARQ) acknowledgement or negative acknowledgement associated with the UE PUSCH 608 transmission. If the UE is unable to transmit the UE PUSCH 608 due to interference during UE sensing period 602, the HARQ communication will be a negative acknowledgement indicating that the eNB did not receive a communication associated with the eNB uplink grant 604. If the UE PUSCH 608 is transmitted and successfully received, then the HARQ communication will be an acknowledgement indicating that the data was successfully decoded at the eNB.

Figure 8:
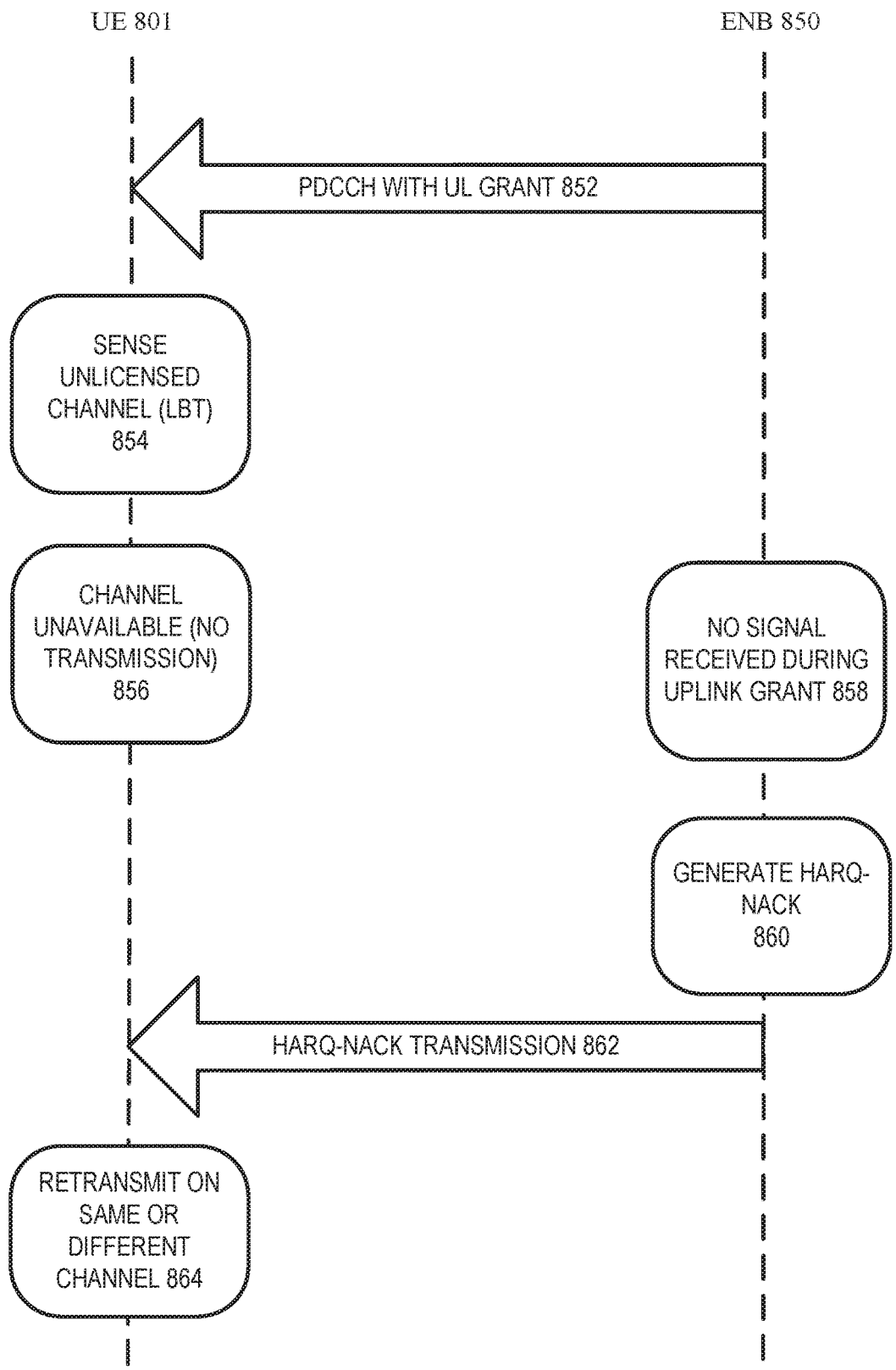
FIG. 8 illustrates aspects of hybrid automatic repeat request (HARQ) operation according to some example embodiments.

FIG. 8 illustrates aspects of hybrid automatic repeat request (HARQ) operation according to some example embodiments. FIG. 8 particularly describes operation when a UE PUSCH transmission associated with an uplink grant is not sent due to the unlicensed channel being unavailable. FIG. 8 describes communications between eNB 850 and UE 801, which may be similar, respectively, to eNB 150 and UE 101 or to any similar device described herein.

The operations of FIG. 8 begin at operation 852 with a physical downlink control channel communication from eNB 850 to UE 801. The PDCCH communication includes an uplink grant for the UE 801 to use an unlicensed channel. In operation 854, the UE senses the unlicensed channel (e.g., performs a listen before talk operation which may be similar to the operations of FIG. 3). In operation 856, the UE reaches a point in the timing of the attempted access to the unlicensed channel where the window for transmitting during the uplink grant period has closed. In other words, a conflict existed such that the unlicensed channel was unavailable to UE 801 at the beginning, or during the entire time period specified by the uplink grant, and no transmission is sent from the UE 801 to the eNB 850 on the unlicensed channel. In operation 858, the eNB 850 senses for an uplink transmission from the UE, but will instead sense a transmission from another device that is using the channel and preventing UE 801 from making the uplink transmission, and so no signal associated with the uplink grant is received at the eNB. In response to the signal not being received, at operation 860 eNB 850 generates a HARQ-negative acknowledgement (NACK) indicating that no data was received. The HARQ-NACK communication 862 may include an additional uplink grant along with the HARQ-NACK. The uplink grant from the HARQ-NACK communication 862 may be an additional grant on the unlicensed channel, or may be a grant on a different channel which is either licensed or unlicensed. The UE 801 then retransmits the data originally scheduled with the uplink grant of operation 852 in a retransmission of operation 864.

Figure 9:
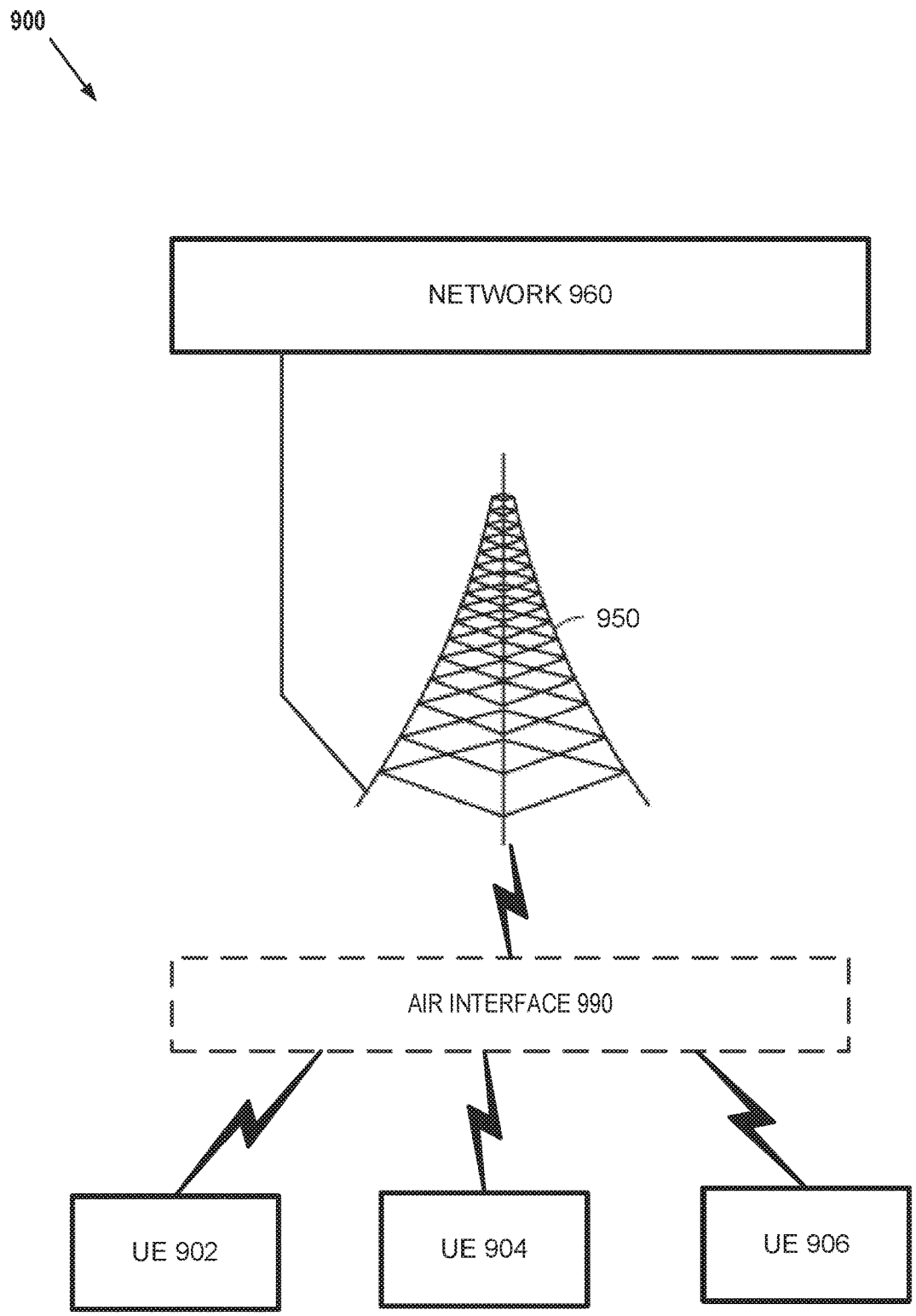
FIG. 9 is a block diagram of a system including eNB and multiple UEs that may be used with some embodiments described herein.

FIG. 9 is a block diagram of a system including eNB and multiple UEs that may be used with some embodiments described herein. FIG. 9 describes eNB 950 coupled to UEs 902, 904, and 906 via air interface 990. eNB 950 provides the UEs with access to network 960, which may be a wide area network or the Internet. Any of these elements may be similar to corresponding elements described above. In some embodiments, eNB 950 sends an uplink grant for a specific subframe on the unlicensed channel to a group of UEs that have requested scheduling. Each of the UEs perform a listen before talk operation. The UE that completes the listen before talk operation first is able to reserve the unlicensed channel until the start of the scheduled uplink subframe, and this successful UE can then transmit data on a PUSCH.

Figure 10:
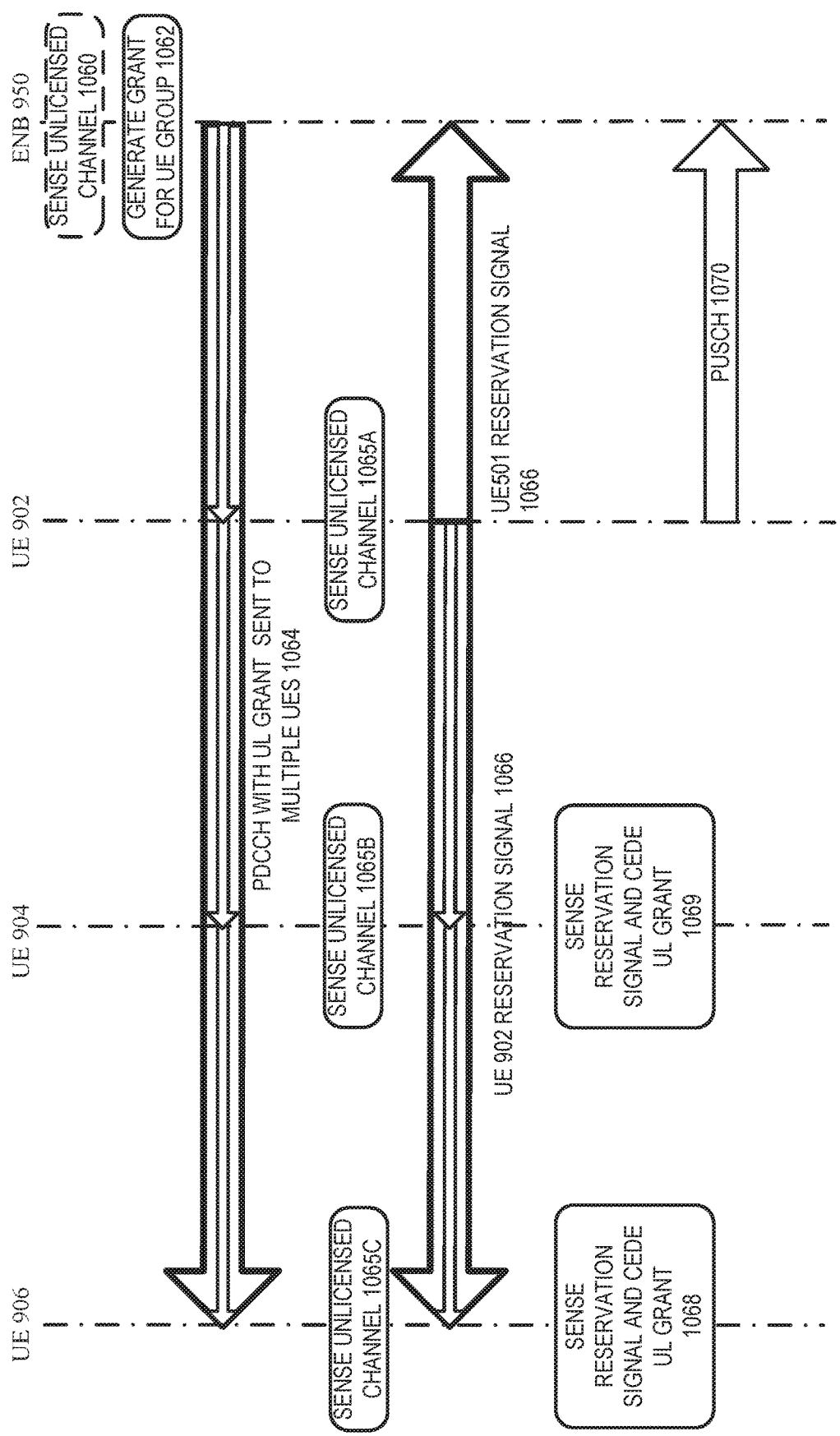
FIG. 10 illustrates aspects of uplink scheduling with license assisted access according to certain embodiments.

FIG. 10 illustrates one embodiment of such contention based scheduling. For the purposes of illustration, the contention based scheduling described in FIG. 10 is discussed within the context of system 900 of FIG. 9. In FIG. 10, eNB 950 initiates a process to provide an uplink grant using contention-based scheduling on an unlicensed channel. In operation 1060, the eNB 950 may optionally sense an unlicensed channel associated with the uplink grant, and if the channel is idle may use a reservation signal. Alternatively, the eNB 950 may simply communicate the uplink grant as detailed in the embodiments above with a single UE. Regardless of whether the eNB uses the unlicensed channel, in operation 1062 the eNB 950 generates a grant for a UE group, and in operation 1064, the eNB 950 sends the uplink grant to the UEs 902, 904, and 904 in the group. In other embodiments, any number of UEs may be in the group. Each of UEs 902, 904, and 906 receive the PDCCH with the uplink grant from eNB 950, and each individually performs a sensing 1065 on the unlicensed channel to determine if the channel is available. Whichever UE finishes the sensing first then transmits a reservation signal. In the embodiment of FIG. 10, UE 902 finishes sensing 1065A before UE 904 finishes sensing 1065B and UE 906 finishes sensing 1065C. UE 902 then transmits a reservation signal in operation 1066. This reservation signal is detected by UE 904 in sensing operation 1065B and by UE 906 in sensing operation 1065C. UEs 904 and 906 then determine that the unlicensed channel is not idle, and cede the UE grant to UE 902 in operations 1068 and 1069. UE 902 continues transmitting the reservation signal until the time period for the uplink grant arrives, and then UE 902 transmits data in PUSCH 1070.

Figure 11:
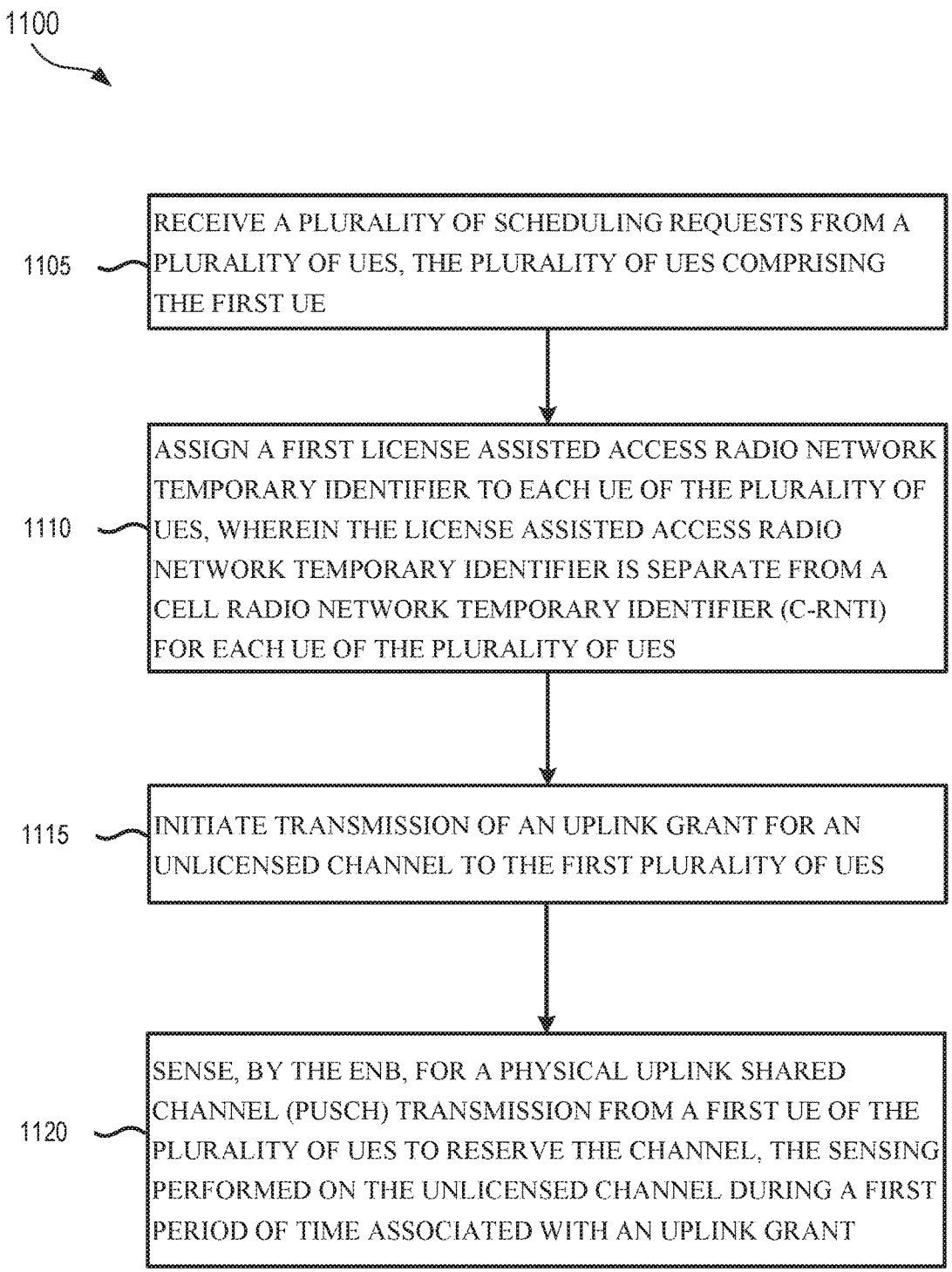
FIG. 11 describes a method for uplink scheduling with license assisted access according to some embodiments.

FIG. 11 describes a method 1100 for uplink scheduling with license assisted access according to some embodiments. In operation 1105, an eNB receives a plurality of scheduling requests from a plurality of UEs, including a scheduling request from a first UE. In operation 1110, the eNB then assigns a first license assisted access radio network temporary identifier to the group of UEs (e.g., each of the UEs is associated with the new RNTI.) This new RNTI, which is the same for each UE of the plurality of UEs, is different than the C-RNTI for each UE, which is a different value for each UE.

The eNB then initiates transmission of an uplink grant for an unlicensed channel to the plurality of UEs in operation 1115. As mentioned above, this may be done on the unlicensed channel using a listen before talk operation, or may be done on other licensed or unlicensed channels. In some embodiments, a master licensed channel is used for all scheduling in a carrier aggregation system that uses multiple licensed channels and multiple unlicensed channels simultaneously. In operation 1120, the eNB then senses the unlicensed channel during an uplink grant time period. This sensing is done to detect a PUSCH transmission from one of the UEs that "wins" the contention and is the first to reserve the unlicensed channel.

Thus, instead of scheduling a single UE for a set of resources (e.g., one subframe) an eNB may send an uplink grant for a specific subframe to a group of UEs who requested scheduling. In some embodiments, a new radio network temporary identifier (RNTI) can be defined for this purpose and a group of UEs will share the same value of this new RNTI. The eNB can use this RNTI instead of the standard cell RNTI when a cyclic redundancy check (CRC) is attached to the downlink control information (DCI) message payload, so that the group of UEs can receive the PDCCH. Upon receiving such uplink grant from the eNB, the group of UEs will enter into contention (e.g. perform listen before talk) to send an uplink data. The first UE with successful carrier sensing can reserve the channel with a reservation signal until the start of the scheduled subframe and then transmit data on PUSCH. The reservation signal can include the UE's C-RNTI, modulation and coding scheme (MCS), or any other such information that may be used by the eNB or other system elements.

EXAMPLES

In various embodiments, methods, apparatus, non-transitory media, computer program products, or other implementations may be presented as example embodiments in accordance with the descriptions provided above. Certain embodiments may include UE such as phones, tablets, mobile computers, or other such devices. Some embodiments may be integrated circuit components of such devices, such as circuits implementing MAC and/or L1 processing on an integrated circuitry. In some embodiments, functionality may be on a single chip or multiple chips in an apparatus. Some such embodiments may further include transmit and receive circuitry on integrated or separate circuits, with antennas that are similarly integrated or separate structures of a device. Any such components or circuit elements may similarly apply to evolved node B embodiments described herein.

Example 1 is a non-transitory computer readable medium comprising instructions that, when executed by one or more processors, configure an evolved node B (eNB) for license assisted access communications, the instructions to configure the eNB to: determine, by the eNB, that a first channel is idle based on a sensing of the first channel for a first period of time; initiate, based on the determination that the first channel is idle, a reservation signal on the first channel for a second period of time following the first period of time; initiate transmission of an uplink grant to a first user equipment (UE), the uplink grant associated with the first channel and a third period of time following the second period of time; and sense, by the eNB, the first channel during the third period of time to detect a physical uplink shared channel (PUSCH) transmission associated with the uplink grant.

In Example 2, the subject matter of Example 1 optionally includes wherein the second period of time is separated from the third period of time by a UE sensing period such that the first UE senses the first channel during the sensing period following transmission of the reservation signal to determine that the first channel is idle during the UE sensing period.

In Example 3, the subject matter of any one or more of Examples 1-2 optionally includes wherein the third period of time immediately follows the second period of time; and wherein the UE is configured to communicate the PUSCH transmission on the first channel during the third period of time without performing a listen-before-talk (LBT) operation.

In Example 4, the subject matter of any one or more of Examples 1-3 optionally includes wherein the uplink grant is communicated from the eNB to the first UE on a second channel different from the first channel as part of a PDCCH transmission.

In Example 5, the subject matter of any one or more of Examples 1-4 optionally includes wherein the reservation signal comprises one or more of a physical downlink control channel (PDCCH), a physical downlink shared channel (PDSCH), and a demodulation reference signal (DRS).

In Example 6, the subject matter of any one or more of Examples 1-5 optionally includes where the reservation signal comprises a primary synchronization signal (PSS) and a secondary synchronization signal (SSS).

In Example 7, the subject matter of any one or more of Examples 1-6 optionally includes wherein the instructions further configure the eNB to: receive a plurality of scheduling requests from a plurality of UEs, the plurality of UEs comprising the first UE; wherein initiating transmission of an uplink grant to the first UE comprises initiating transmission of the uplink grant to each UE of the plurality of UEs.

In Example 8, the subject matter of Example 7 optionally includes wherein the instructions further configure the eNB to assign a first license assisted access radio network temporary identifier to each UE of the plurality of UEs, wherein the license assisted access radio network temporary identifier is separate from a cell radio network temporary identifier (C-RNTI) for each UE of the plurality of UEs; wherein the transmission of the uplink grant is communicated to each UE of the plurality of UEs using the first license assisted access radio network temporary identifier such that the first plurality of UEs receives the downlink grant using a same identifier In Example 9, the subject matter of examples 1-8 above includes embodiments wherein each UE of the plurality of UE performs a listen before talk (LBT) operation after receiving the uplink grant; wherein the first UE completes a successful carrier sensing operation and reserves the first channel with a second reservation signal prior to each other UE of the plurality of UEs. Such embodiments can operate wherein the second reservation signal comprises a first C-RNTI for the first UE.

In Example 10, the subject matter of any one or more of Examples 1-9 optionally includes wherein the instructions further configure the eNB to: successfully decode the PUSCH transmission associated with the uplink grant; and transmit a synchronous hybrid automatic repeat request associated with the PUSCH transmission to the first UE.

In Example 11, the subject matter of any one or more of Examples 1-10 optionally includes wherein the instructions further configure the eNB to: determine that the eNB has failed to identify the PUSCH transmission on the first channel during the third period of time; and transmit an asynchronous hybrid automatic repeat request from the eNB to the first UE in response to the failure to identify the PUSCH transmission.

In Example 12, the subject matter of Example 11 optionally includes wherein the uplink grant comprises a transmission grant associated with the third time period and a retransmission grant associated with a fourth time period following the second time period.

In Example 13, the subject matter of Example 12 optionally includes wherein a number of physical resource blocks for the uplink grant are adjusted dynamically by the eNB between the third time period and the fourth time period.

In Example 14, the subject matter of any one or more of Examples 12-13 optionally includes wherein the modulation and coding scheme associated with the uplink grant is set dynamically by the eNB based on the sensing of the first channel for a first period of time and the failure to identify the PUSCH transmission.

Example 15 is an apparatus of an evolved node B (eNB) comprising control circuitry configured to: determine that a first channel is idle based on a sensing of the first channel for a first period of time; initiate, based on the determination that the first channel is idle, a reservation signal on the first channel for a second period of time following the first period of time; initiate transmission of an uplink grant to a first user equipment (UE), the uplink grant associated with the first channel and a third period of time following the second period of time; and initiate sensing of the first channel during the third period of time to detect a physical uplink shared channel (PUSCH) transmission associated with the uplink grant; and generate a hybrid automatic repeat request for transmission to the first UE in response to the sensing of the first channel.

In Example 16, the subject matter of Example 15 optionally includes further comprising: receive circuitry coupled to the control circuitry and configured to sense the first channel during the first period of time and the second period of time and to receive the PUSCH transmission; and transmit circuitry coupled to the control circuitry and configured to transmit the reservation signal to the first UE on the first channel.

In Example 17, the subject matter of any one or more of Examples 15-16 optionally includes wherein the receive circuitry and the transmit circuitry are coupled to a first antenna; wherein the first antenna is configured for communications on the first channel comprising an unlicensed channel and wherein the first antenna is further configured for communications on a second channel comprising a licensed channel.

Example 18 is a non-transitory computer readable medium comprising instructions that, when executed by one or more processors, configure a user equipment (UE) for license assisted access communication with an evolved node B (eNB), the instructions to configure the UE to: receive, from the eNB, an uplink grant associated with a first unlicensed channel and a first period of time; determine that the first unlicensed channel is available for a physical uplink shared channel (PUSCH) transmission during the first period of time; transmit the PUSCH transmission to the eNB during the first period of time; and receive a hybrid automatic repeat request associated with the PUSCH transmission from the eNB.

In Example 19, the subject matter of Example 18 optionally includes wherein the UE determines that the first unlicensed channel is available for the PUSCH transmission-based receipt of a reservation signal transmitted from the eNB.

In Example 20, the subject matter of any one or more of Examples 18-19 optionally includes wherein the UE determines that the first unlicensed channel is available for the PUSCH transmission based on a listen before talk operation performed by the UE.

Example 21 is an apparatus of an user equipment (UE) configured for license assisted access communications with an evolved node B (eNB), the UE comprising: receive circuitry configured to receive, from the eNB, an uplink grant for a physical uplink shared channel (PUSCH) transmission, and to receive an asynchronous hybrid automatic repeat request associated with the PUSCH transmission; control circuitry configured to determine that the first unlicensed channel is available for the PUSCH transmission; and transmit circuitry configured to transmit the PUSCH transmission to the eNB in response to the control circuitry determining that the first unlicensed channel is available for the PUSCH transmission.

In Example 22, the subject matter of Example 21 optionally includes wherein the control circuitry is configured to determine that the first unlicensed channel is available for the PUSCH transmission by: decoding the uplink grant to identify a first license assisted access radio network temporary identifier associated with a plurality of UEs; process carrier sensing data from the receive circuitry to determine that the first unlicensed channel meets a set of availability criteria and that each other UE of the plurality of UEs has not sent a prior reservation signal; and initiate transmission using the transmit circuitry of a first UE reservation signal, the first UE reservation signal comprising a first cell radio network temporary identifier (C-RNTI) for the first UE.

Example 23 is a method of uplink scheduling for wireless communication systems, comprising: an eNB and UEs capable of performing listen-before-talk (LBT) with extended CCA mechanism, wherein i) the eNB and UE can sense the channel to determine if the channel is busy or idle, and transmit after a random duration specified within a given interval; and ii) the eNB and UE can reserve the channel for a specific duration by sending data, reference signals or any other known possible signal.

Example 24 is the method of example 23 wherein an eNB can schedule UEs using the existing PDCCH mechanism and allocate resources for the uplink subframe in unlicensed bands.

Example 25 is the method of examples 23-24 wherein an eNB senses the channel, reserves the channel with a reservation signal, and transmits uplink grants to UEs, and the UEs transmit PUSCH on the scheduled subframe without sensing the channel.

Example 26 is the method of examples 23-25 wherein an eNB senses the channel, and reserves the channel with a reservation signal, and transmits uplink grants to UEs, and the UEs transmit PUSCH on the scheduled subframe after sensing the channel. If the channel is not idle, the UEs do not transmit.

Example 27 is a method which transmits uplink grants to UEs on licensed band via cross-carrier scheduling (without sensing the channel), and UEs transmit PUSCH on the scheduled subframe only when the channel is sensed idle.

Example 28 is the method of examples 23-27 wherein the reservation signal can be DL transmissions, e.g., (e) PDCCH, PDSCH, DRS, and PSS/SSS.

Example 29 is the method of examples 23-28 wherein the eNB should not transmit anything on unlicensed carrier for a certain time duration during which the scheduled UE can sense the channel.

Example 30 is the method of examples 23-29 where a new DCI can be defined for scheduling multiple subframes for a UE with a single uplink grant. The DCI format can include C-RNTI of the UE and the number of maximum subframes the UE is allowed to transmit.

Example 31 is the method of examples 23-30 wherein an eNB may send an uplink grant for a specific subframe to a group of UEs who requested scheduling.

Example 32 is the method of examples 23-31 wherein a new RNTI can be defined and used by the eNB instead of C-RNTI when CRC is attached to the DCI message payload, so that the group of UEs assigned the same value can receive the PDCCH.

Example 33 is the method of examples 23-32 wherein upon receiving an uplink grant from the eNB, the group of UEs performs LBT. The first UE with successful carrier sensing can reserve the channel with a reservation signal until the start of the scheduled subframe and then transmit data on PUSCH.

Example 34 is the method of examples 23-33 wherein the reservation signal can include the UE's C-RNTI, MCS, etc.

Example 35 is the method of examples 23-34 wherein both eNB and UE perform LBT independently with their own LBT parameters.

Example 36 is the method of any embodiment above wherein flexible asynchronous HARQ operation is used.

Example 37 is the method of any embodiment above wherein an eNB can send an uplink grant for each uplink transmission (including initial transmission and retransmission) unlicensed bands for asynchronous HARQ operation.

Example 38 is the method of any embodiment above wherein the eNB can dynamically change parameters, e.g., the number of PRBs and MCS.

Example 39 is the method of any embodiment above wherein the eNB performs a blind detection, for instance, energy detection or any form of detection, for the scheduled PUSCH resources.

Further, in addition to the specific combinations of examples described above, any of the examples detailing further implementations of an element of an apparatus or medium may be applied to any other corresponding apparatus or medium, or may be implemented in conjunction with another apparatus or medium. Thus, each example above may be combined with each other example in various ways both as implementations in a system and as combinations of elements to generate an embodiment from the combination of each example or group of examples. For example, any embodiment above describing a transmitting device will have an embodiment that receives the transmission, even if such an embodiment is not specifically detailed. Similarly, methods, apparatus examples, and computer readable medium examples may each have a corresponding example of the other type even if such examples for every embodiment are not specifically detailed.

Example Systems and Devices

Figure 12:
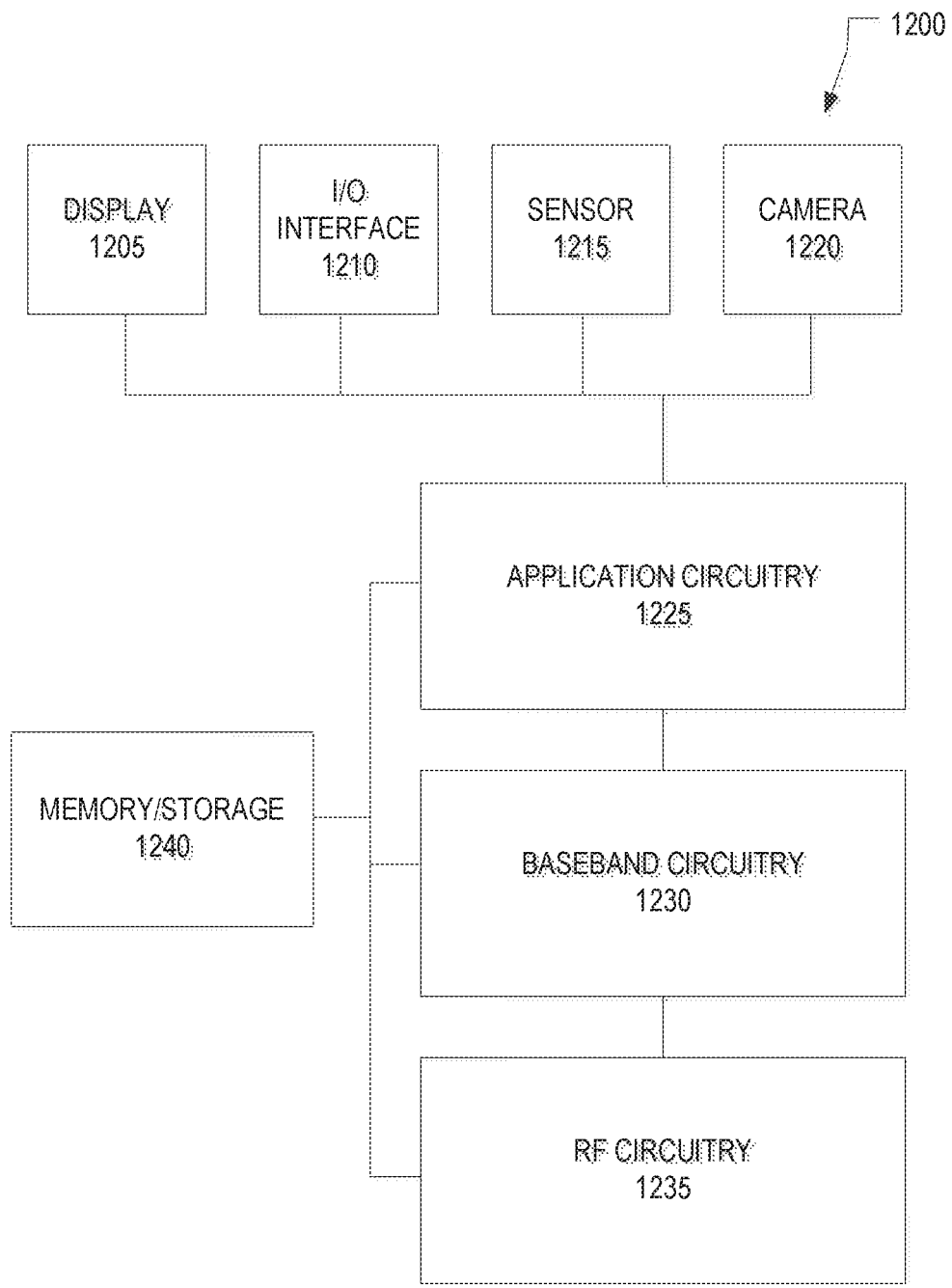
FIG. 12 illustrates aspects of a computing machine, according to some example embodiments.

FIG. 12 illustrates aspects of a computing machine according to some example embodiments. Embodiments described herein may be implemented into a system 1200 using any suitably configured hardware and/or software. FIG. 12 illustrates, for some embodiments, an example system 1200 comprising radio frequency (RE) circuitry 1235, baseband circuitry 1230, application circuitry 1225, memory/storage 1240, a display 1205, a camera 1220, a sensor 1215, and an input/output (I/O) interface 1210, coupled with each other at least as shown.

The application circuitry 1225 may include circuitry such as, but not limited to, one or more single-core or multi-core processors. The processor(s) may include any combination of general-purpose processors and dedicated processors (e.g., graphics processors, application processors, etc.). The processors may be coupled with the memory/storage 1240 and configured to execute instructions stored in the memory/storage 1240 to enable various applications and/or operating systems running on the system 1200.

The baseband circuitry 1230 may include circuitry such as, but not limited to, one or more single-core or multi-core processors. The processor(s) may include a baseband processor. The baseband circuitry 1230 may handle various radio control functions that enable communication with one or more radio networks via the RF circuitry 1235. The radio control functions may include, but are not limited to, signal modulation, encoding, decoding, radio frequency shifting, and the like. In some embodiments, the baseband circuitry 1230 may provide for communication compatible with one or more radio technologies. For example, in some embodiments, the baseband circuitry 1230 may support communication with an evolved universal terrestrial radio access network (EUTRAN), other wireless metropolitan area networks (WMANs), a wireless local area network (WLAN), or a wireless personal area network (WPAN). Embodiments in which the baseband circuitry 1230 is configured to support radio communications of more than one wireless protocol may be referred to as multi-mode baseband circuitry.

In various embodiments, the baseband circuitry 1230 may include circuitry to operate with signals that are not strictly considered as being in a baseband frequency. For example, in some embodiments, the baseband circuitry 1230 may include circuitry to operate with signals having an intermediate frequency, which is between a baseband frequency and a radio frequency.

The RF circuitry 1235 may enable communication with wireless networks using modulated electromagnetic radiation through a non-solid medium. In various embodiments, the RF circuitry 1235 may include switches, filters, amplifiers, and the like to facilitate the communication with the wireless network.

In various embodiments, the RF circuitry 1235 may include circuitry to operate with signals that are not strictly considered as being in a radio frequency. For example, in some embodiments, the RF circuitry 1235 may include circuitry to operate with signals having an intermediate frequency, which is between a baseband frequency and a radio frequency.

In various embodiments, the transmitter circuitry or receiver circuitry discussed above with respect to the UE or eNB may be embodied in whole or in part in one or more of the RF circuitry 1235, the baseband circuitry 1230, and/or the application circuitry 1225.

In some embodiments, some or all of the constituent components of a baseband processor may be used to implement aspects of any embodiment described herein. Such embodiments may be implemented by the baseband circuitry 1230, the application circuitry 1225, and/or the memory/storage 1240 may be implemented together on a system on a chip (SOC).

The memory/storage 1240 may be used to load and store data and/or instructions, for example, for the system 1200. The memory/storage 1240 for one embodiment may include any combination of suitable volatile memory (e.g., dynamic random access memory (DRAM)) and/or non-volatile memory (e.g., flash memory).

In various embodiments, the I/O interface 1210 may include one or more user interfaces designed to enable user interaction with the system 1200 and/or peripheral component interfaces designed to enable peripheral component interaction with the system 1200. User interfaces may include, but are not limited to, a physical keyboard or keypad, a touchpad, a speaker, a microphone, and so forth. Peripheral component interfaces may include, but are not limited to, a non-volatile memory port, a universal serial bus (USB) port, an audio jack, and a power supply interface.

In various embodiments, the sensor 1215 may include one or more sensing devices to determine environmental conditions and/or location information related to the system 1200. In some embodiments, the sensors 1215 may include, but are not limited to, a gyro sensor, an accelerometer, a proximity sensor, an ambient light sensor, and a positioning unit. The positioning unit may also be part of, or interact with, the baseband circuitry 1230 and/or RF circuitry 1235 to communicate with components of a positioning network (e.g., a global positioning system (GPS) satellite). In various embodiments, the display 1205 may include a display (e.g., a liquid crystal display, a touch screen display, etc.).

In various embodiments, the system 1200 may be a mobile computing device such as, but not limited to, a laptop computing device, a tablet computing device, a netbook, an ultrabook, a smartphone, and the like. In various embodiments, the system 1200 may have more or fewer components, and/or different architectures.

Figure 13:
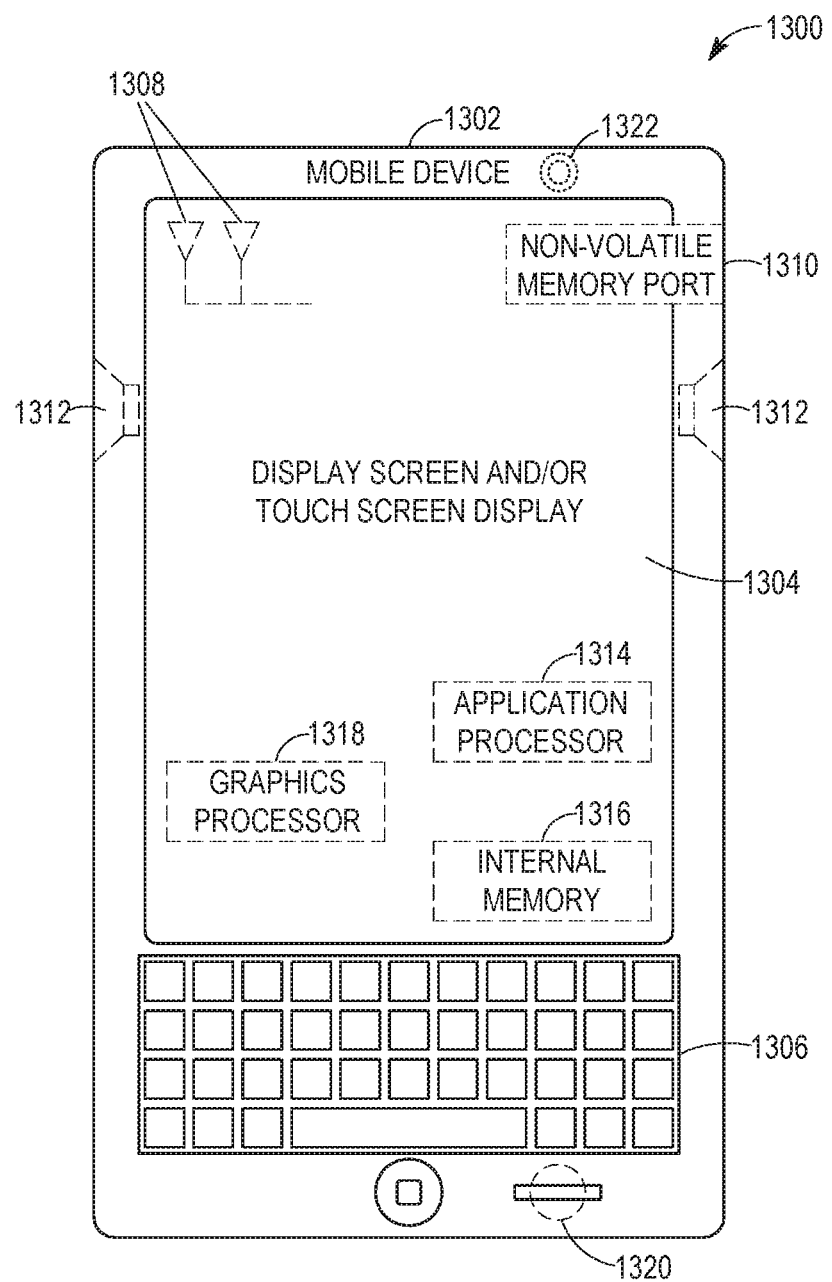
FIG. 13 illustrates aspects of a UE, in accordance with some example embodiments.

FIG. 13 shows an example UE, illustrated as a UE 1300. The UE 1300 may be an implementation of the UE 121, the eNB 150, or any device described herein. The UE 1300 can include one or more antennas 1308 configured to communicate with a transmission station, such as a base station (BS), an eNB, or another type of wireless wide area network (WWAN) access point. The UE 1300 can be configured to communicate using at least one wireless communication standard including 3GPP LTE, WiMAX, High Speed Packet Access (HSPA), Bluetooth, and WiFi. The UE 1300 can communicate using separate antennas for each wireless communication standard or shared antennas for multiple wireless communication standards. The UE 1300 can communicate in a WLAN, a WPAN, and/or a WWAN.

FIG. 13 also shows a microphone 1320 and one or more speakers 1312 that can be used for audio input and output to and from the UE 1300. A display screen 1304 can be a liquid crystal display (LCD) screen, or another type of display screen such as an organic light emitting diode (OLED) display. The display screen 1304 can be configured as a touch screen. The touch screen can use capacitive, resistive, or another type of touch screen technology. An application processor 1314 and a graphics processor 1318 can be coupled to an internal memory 1316 to provide processing and display capabilities. A non-volatile memory port 1310 can also be used to provide data I/O options to a user. The non-volatile memory port 1310 can also be used to expand the memory capabilities of the UE 1300. A keyboard 1306 can be integrated with the UE 1300 or wirelessly connected to the UE 1300 to provide additional user input. A virtual keyboard can also be provided using the touch screen. A camera 1322 located on the front (display screen) side or the rear side of the UE 1300 can also be integrated into the housing 1302 of the UE 1300.

Figure 14:
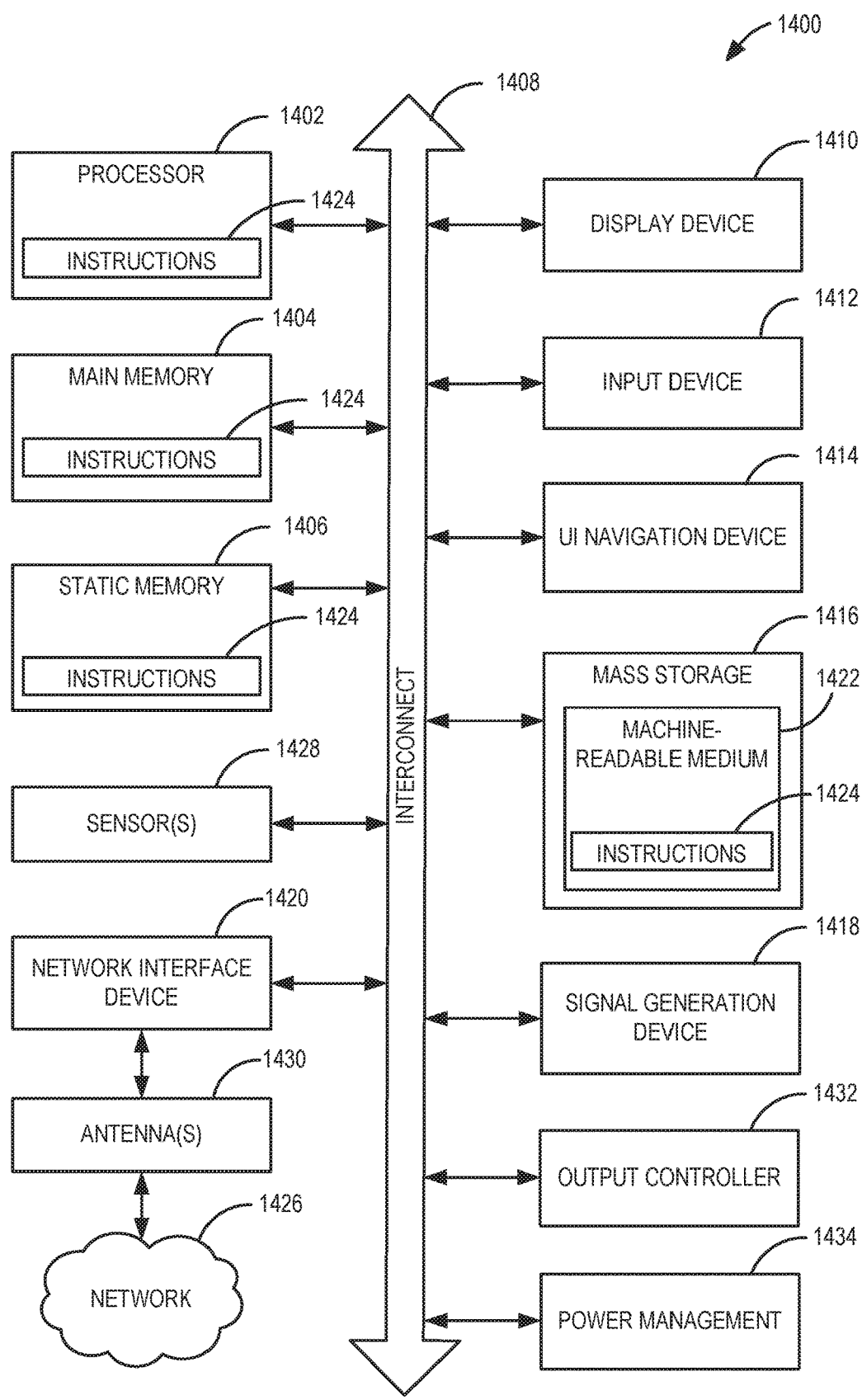
FIG. 14 is a block diagram illustrating an example computer system machine which may be used in association with various embodiments described herein.

FIG. 14 is a block diagram illustrating an example computer system machine 1400 upon which any one or more of the methodologies herein discussed can be run, and which may be used to implement the eNB 150, the UE 121, or any other device described herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system machine 1400 includes a processor 1402 (e.g., a central processing unit (CPU), a graphics processing unit (GPU), or both), a main memory 1404, and a static memory 1406, which communicate with each other via an interconnect 1408 (e.g., a link, a bus, etc.). The computer system machine 1400 can further include a video display unit 1410, an alphanumeric input device 1412 (e.g., a keyboard), and a user interface (UI) navigation device 1414 (e.g., a mouse). In one embodiment, the video display unit 1410, input device 1412, and UI navigation device 1414 are a touch screen display. The computer system machine 1400 can additionally include a mass storage device 1416 a drive unit), a signal generation device 1418 (e.g., a speaker), an output controller 1432, a power management controller 1434, a network interface device 1420 (which can include or operably communicate with one or more antennas 1430, transceivers, or other wireless communications hardware), and one or more sensors 1428, such as a UPS sensor, compass, location sensor, accelerometer, or other sensor.

The storage device 1416 includes a machine-readable medium 1422 on which is stored one or more sets of data structures and instructions 1424 (e.g., software) embodying or utilized by any one or more of the methodologies or functions described herein. The instructions 1424 can also reside, completely or at least partially, within the main memory 1404, static memory 1406, and/or processor 1402 during execution thereof by the computer system machine 1400, with the main memory 1404, the static memory 1406, and the processor 1402 also constituting machine-readable media.

While the machine-readable medium 1422 is illustrated in an example embodiment to be a single medium, the term "machine-readable medium" can include a single medium or multiple media (e.g., a centralized or distributed database, and/or associated caches and servers) that store the one or more instructions 1424. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions.

The instructions 1424 can further be transmitted or received over a communications network 1426 using a transmission medium via the network interface device 1420 utilizing any one of a number of well-known transfer protocols (e.g., hypertext transfer protocol HTTP). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions) embodied in tangible media, such as floppy diskettes, CD-ROMs, hard drives, non-transitory computer readable storage media, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, Erasable Programmable Read-Only Memory (EPROM), flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, Institute of Electrical and Electronic Engineers (IEEE) 1402.11, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 1402.16 (e.g., 1402.16p), or Bluetooth (e.g., Bluetooth 13.0, or like standards defined by the Bluetooth Special Interest Group) standards families. Other applicable network configurations can be included within the scope of the presently described communication networks. It will be understood that communications on such communication networks can be facilitated using any number of PANs, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), RAM, semiconductor memory devices (e.g., EPROM, Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

It should be understood that the functional units or capabilities described in this specification may have been referred to or labeled as components or modules in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:

1. A non-transitory computer readable medium comprising instructions that, when executed by one or more processors, configure an evolved node B (eNB) for license assisted access (LAA) communications, the instructions to configure the eNB to:
determine, by the eNB, that a first channel is idle based on a sensing of the first channel for a first period of time;
initiate, based on the determination that the first channel is idle, a reservation signal on the first channel for a second period of time following the first period of time;
initiate transmission of an uplink grant to a first user equipment (UE), the uplink grant associated with the first channel and a third period of time following the second period of time, wherein the uplink grant comprises a first license assisted access radio network temporary identifier associated with a plurality of UEs; and
sense, by the eNB, the first channel during the third period of time to detect a physical uplink shared channel (PUSCH) transmission associated with the uplink grant;
wherein the PUSCH transmission is received at the eNB in response to operations performed by the first UE to:
decode the uplink grant to identify a first license assisted access radio network temporary identifier associated with a plurality of UEs;
process carrier sensing data from the receive circuitry to determine that the first unlicensed channel meets a set of availability criteria and that each other UE of the plurality of UEs has not sent a prior reservation signal; and
initiate transmission a first UE reservation signal, the first UE reservation signal comprising a first cell radio network temporary identifier (C-RNTI) for the first UE.

2. The computer readable medium of claim 1 wherein the second period of time is separated from the third period of time by a UE sensing period such that the first UE senses the first channel during the sensing period following transmission of the reservation signal to determine that the first channel is idle during the UE sensing period.

3. The computer readable medium of claim 1 wherein the third period of time immediately follows the second period of time; and
wherein the UE is configured to communicate the PUSCH transmission on the first channel during the third period of time without performing a listen-before-talk (LBT) operation.

4. The computer readable medium of claim 3 wherein the uplink grant is communicated from the eNB to the first UE on a second channel different from the first channel as part of a physical downlink control channel (PDCCH) transmission.

5. The computer readable medium of claim 4 wherein the reservation signal comprises one or more of a physical downlink control channel (PDCCH), a physical downlink shared channel (PDSCH), and a demodulation reference signal (DRS).

6. The computer readable medium of claim 5 where the reservation signal comprises a primary synchronization signal (PSS) and a secondary synchronization signal (SSS).

7. The computer readable medium of claim 6 wherein the instructions further configure the eNB to:
receive a plurality of scheduling requests from the plurality of UEs, the plurality of UEs comprising the first UE;
wherein initiating transmission of an uplink grant to the first UE comprises initiating transmission of the uplink grant to each UE of the plurality of UEs.

8. The computer readable medium of claim 7 wherein the instructions further configure the eNB to assign a first license assisted access radio network temporary identifier to each UE of the plurality of UEs, wherein the license assisted access radio network temporary identifier is separate from a cell radio network temporary identifier (C-RNTI) for each UE of the plurality of UEs;
wherein the transmission of the uplink grant is communicated to each UE of the plurality of UEs using the first license assisted access radio network temporary identifier such that the first plurality of UEs receives the downlink grant using a same identifier.

9. The computer readable medium of claim 1 wherein each UE of the plurality of UEs performs a listen before talk (LBT) operation after receiving the uplink grant;
wherein the first UE completes a successful carrier sensing operation and reserves the first channel with a second reservation signal prior to each other UE of the plurality of UEs.

10. The computer readable medium of claim 9 wherein the second reservation signal comprises the first C-RNTI for the first UE.

11. The computer readable medium of claim 10 wherein the instructions further configure the eNB to:
successfully decode the PUSCH transmission associated with the uplink grant; and
transmit a synchronous hybrid automatic repeat request associated with the PUSCH transmission to the first UE.

12. The computer readable medium of claim 10 wherein the instructions further configure the eNB to:
determine that the eNB has failed to identify the PUSCH transmission on the first channel during the third period of time; and
transmit an asynchronous hybrid automatic repeat request from the eNB to the first UE in response to the failure to identify the PUSCH transmission.

13. The computer readable medium of claim 12 wherein the uplink grant comprises a transmission grant associated with the third time period and a retransmission grant associated with a fourth time period following the second time period.

14. The computer readable medium of claim 13 wherein a number of physical resource blocks for the uplink grant are adjusted dynamically by the eNB between the third time period and the fourth time period.

15. The computer readable medium of claim 13 wherein the modulation and coding scheme associated with the uplink grant is set dynamically by the eNB based on the sensing of the first channel for a first period of time and the failure to identify the PUSCH transmission.

16. The computer readable medium of claim 15 wherein the uplink grant wherein the uplink grant is communicated to the UE from the eNB via a physical downlink control channel (PDCCH) transmitted on a first licensed channel separate from the first channel.

17. An apparatus of an evolved node B (eNB) comprising control circuitry configured to:
determine that a first channel is idle based on a sensing of the first channel for a first period of time;
initiate, based on the determination that the first channel is idle, a reservation signal on the first channel for a second period of time following the first period of time;
initiate transmission of an uplink grant to a first user equipment (UE), the uplink grant associated with the first channel and a third period of time following the second period of time; and
initiate sensing of the first channel during the third period of time to detect a physical uplink shared channel (PUSCH) transmission associated with the uplink grant; and
generate a hybrid automatic repeat request for transmission to the first UE in response to the sensing of the first channel;
wherein the PUSCH transmission is received at the eNB in response to operations performed by the first UE to:
decode the uplink grant to identify a first license assisted access radio network temporary identifier associated with a plurality of UEs;
process carrier sensing data from the receive circuitry to determine that the first unlicensed channel meets a set of availability criteria and that each other UE of the plurality of UEs has not sent a prior reservation signal; and
initiate transmission a first UE reservation signal, the first UE reservation signal comprising a first cell radio network temporary identifier (C-RNTI) for the first UE.

18. The apparatus of claim 17 further comprising:
receive circuitry coupled to the control circuitry and configured to sense the first channel during the first period of time and the second period of time and to receive the PUSCH transmission; and
transmit circuitry coupled to the control circuitry and configured to transmit the reservation signal to the first UE on the first channel.

19. The apparatus of claim 17 wherein the receive circuitry and the transmit circuitry are coupled to a first antenna;
wherein the first antenna is configured for communications on the first channel comprising an unlicensed channel and wherein the first antenna is further configured for communications on a second channel comprising a licensed channel.

20. A non-transitory computer readable medium comprising instructions that, when executed by one or more processors, configure a user equipment (UE) for license assisted access communication with an evolved node B (eNB), the instructions to configure the UE to:
receive, from the eNB, an uplink grant associated with a first unlicensed channel and a first period of time;
determine that the first unlicensed channel is available for a physical uplink shared channel (PUSCH) transmission during the first period of time;
transmit the PUSCH transmission to the eNB during the first period of time; and
receive a hybrid automatic repeat request associated with the PUSCH transmission from the eNB;
wherein the UE is configured to determine that the first unlicensed channel is available for the PUSCH transmission using instructions that configure the UE to further:
decode the uplink grant to identify a first license assisted access radio network temporary identifier associated with a plurality of UEs;
process carrier sensing data from the receive circuitry to determine that the first unlicensed channel meets a set of availability criteria and that each other UE of the plurality of UEs has not sent a prior reservation signal; and
initiate transmission a first UE reservation signal, the first UE reservation signal comprising a first cell radio network temporary identifier (C-RNTI) for the first UE.

21. The computer readable medium of claim 20 wherein the hybrid automatic repeat request is received at the UE via a first licensed channel separate from the first unlicensed channel.

22. The computer readable medium of claim 21 wherein the UE determines that the first unlicensed channel is available for the PUSCH transmission-based receipt of a reservation signal transmitted from the eNB.

23. The computer readable medium of claim 20 wherein the UE determines that the first unlicensed channel is available for the PUSCH transmission based on a listen before talk operation performed by the UE.

24. An apparatus of an user equipment (UE) configured for license assisted access communications with an evolved node B (eNB), the UE comprising:
  receive circuitry configured to receive, from the eNB, an uplink grant for a physical uplink shared channel (PUSCH) transmission, and further configured to receive, from the eNB, and to receive an asynchronous hybrid automatic repeat request (HARQ) associated with the PUSCH transmission;
  control circuitry configured to determine that the first unlicensed channel is available for the PUSCH transmission; and
  transmit circuitry configured to transmit the PUSCH transmission to the eNB in response to the control circuitry determining that the first unlicensed channel is available for the PUSCH transmission;
  wherein the control circuitry is configured to determine that the first unlicensed channel is available for the PUSCH transmission by:
  decoding the uplink grant to identify a first license assisted access radio network temporary identifier associated with a plurality of UEs;
  process carrier sensing data from the receive circuitry to determine that the first unlicensed channel meets a set of availability criteria and that each other UE of the plurality of UEs has not sent a prior reservation signal; and
  initiate transmission using the transmit circuitry of a first UE reservation signal, the first UE reservation signal comprising a first cell radio network temporary identifier (C-RNTI) for the first UE.

* * * * *